(12) United States Patent
    Adhiraju et al.

(10) Patent No.: US 8,620,724 B2
(45) Date of Patent:     Dec. 31, 2013

(54) INTEGRATION FRAMEWORK FOR ENTERPRISE CONTENT MANAGEMENT SYSTEMS

(75) Inventors: Shrikrishna Adhiraju, Andhra Pradesh (IN); Sudhakar Kanakaraj, Tamilnadu (IN); Sachin Yambal, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 623 days.

(21) Appl. No.: 12/820,255

(22) Filed: Jun. 22, 2010

(65) Prior Publication Data
    US 2011/0258136 A1      Oct. 20, 2011

(30) Foreign Application Priority Data
    Apr. 20, 2010    (IN) .............................. 1123CHE2010

(51) Int. Cl.
    *G06Q 10/00*    (2012.01)
(52) U.S. Cl.
    USPC ........ 705/7.36; 705/7.37; 705/7.38; 719/313; 719/328
(58) Field of Classification Search
    USPC ........................ 705/7.11–7.42; 709/201–223; 717/100–120; 719/313–328
    See application file for complete search history.

(56) References Cited

U.S. PATENT DOCUMENTS

| | | |
|---|---|---|
| 5,420,861 A | 5/1995 | De La Bourdonnaye |
| 5,913,061 A | 6/1999 | Gupta et al. |
| 5,970,490 A | 10/1999 | Morgenstern |
| 6,208,345 B1 | 3/2001 | Sheard et al. |
| 6,260,078 B1 | 7/2001 | Fowlow |
| 6,314,533 B1 | 11/2001 | Novik et al. |
| 6,327,594 B1 | 12/2001 | Van Huben et al. |
| 6,338,055 B1 | 1/2002 | Hagmann et al. |
| 6,339,782 B1 | 1/2002 | Gerard et al. |
| 6,363,435 B1 | 3/2002 | Fernando et al. |
| 6,405,264 B1 | 6/2002 | Jindal et al. |
| 6,405,266 B1 | 6/2002 | Bass et al. |
| 6,408,291 B1 | 6/2002 | Skeen et al. |

(Continued)

FOREIGN PATENT DOCUMENTS

WO    0075849 A2    12/2000

OTHER PUBLICATIONS

"A Web services-based framework for business integration solutions"; Ying Huang, Jen-Yao Chung; Electronic Commerce Research and Applications 2 (2003) 15-26.*

(Continued)

*Primary Examiner* — Alan S Miller
(74) *Attorney, Agent, or Firm* — Fish & Richardson P.C.

(57) ABSTRACT

Integration framework for enterprise content management systems, in which a request related to performing an operation associated with enterprise content management is received from a customer relationship management application. In response to the request, a standard user interface is provided and user input that is entered into the standard user interface and that requests performance of an enterprise content management operation is received. In response to the user input, a particular enterprise content management system to perform the enterprise content management operation is identified from among multiple, different enterprise content management systems and a particular connector component configured to interface with the particular enterprise content management system is selected from among multiple, different connector components. The particular connector component is used to interface with the particular enterprise content management system and control the particular enterprise content management system to perform the enterprise content management operation.

20 Claims, 19 Drawing Sheets

(56) References Cited

U.S. PATENT DOCUMENTS

| | | | |
|---|---|---|---|
| 6,535,855 B1 | 3/2003 | Cahill et al. | |
| 6,549,956 B1 | 4/2003 | Bass et al. | |
| 6,643,663 B1* | 11/2003 | Dabney et al. | 1/1 |
| 6,704,785 B1 | 3/2004 | Koo et al. | |
| 6,721,779 B1 | 4/2004 | Maffeis | |
| 6,738,975 B1 | 5/2004 | Yee et al. | |
| 6,741,980 B1 | 5/2004 | Langesh et al. | |
| 6,931,392 B1 | 8/2005 | Skeen | |
| 6,959,340 B1 | 10/2005 | Najmi | |
| 7,181,302 B2* | 2/2007 | Bayne | 700/96 |
| 7,213,022 B2* | 5/2007 | Whelan et al. | 707/610 |
| 7,262,613 B2* | 8/2007 | Komatsu et al. | 324/754.03 |
| 7,272,613 B2* | 9/2007 | Sim et al. | 709/223 |
| 7,415,716 B2* | 8/2008 | Marin et al. | 719/330 |
| 7,536,697 B2 | 5/2009 | Wiseman et al. | |
| 7,835,931 B2* | 11/2010 | Bayne | 705/7.38 |
| 8,275,749 B2* | 9/2012 | D'Souza et al. | 707/656 |
| 8,346,929 B1* | 1/2013 | Lai | 709/226 |
| 2002/0124116 A1* | 9/2002 | Yaung | 709/313 |
| 2002/0133392 A1* | 9/2002 | Angel et al. | 705/10 |
| 2002/0133491 A1* | 9/2002 | Sim et al. | 707/10 |
| 2003/0055868 A1* | 3/2003 | Fletcher et al. | 709/201 |
| 2004/0187140 A1* | 9/2004 | Aigner et al. | 719/328 |
| 2004/0230941 A1* | 11/2004 | Marin et al. | 717/100 |
| 2005/0075914 A1* | 4/2005 | Bayne | 705/7 |
| 2005/0243611 A1* | 11/2005 | Lubbers et al. | 365/189.05 |
| 2005/0246311 A1* | 11/2005 | Whelan et al. | 707/1 |
| 2005/0256735 A1* | 11/2005 | Bayne | 705/1 |
| 2006/0059107 A1 | 3/2006 | Elmore et al. | |
| 2006/0174017 A1* | 8/2006 | Robertson | 709/229 |
| 2007/0083484 A1* | 4/2007 | McVeigh et al. | 707/1 |
| 2007/0094300 A1* | 4/2007 | Abnous et al. | 707/103 R |
| 2007/0192374 A1* | 8/2007 | Abnous et al. | 707/200 |
| 2007/0198267 A1* | 8/2007 | Jones et al. | 704/257 |
| 2008/0126513 A1* | 5/2008 | Bouchard et al. | 709/217 |
| 2009/0106271 A1* | 4/2009 | Chieu et al. | 707/100 |
| 2009/0150866 A1* | 6/2009 | Schmidt | 717/120 |
| 2009/0249290 A1* | 10/2009 | Jenkins et al. | 717/109 |
| 2009/0249446 A1* | 10/2009 | Jenkins et al. | 726/3 |
| 2011/0258136 A1* | 10/2011 | Adhiraju et al. | 705/342 |
| 2012/0072436 A1* | 3/2012 | Pierre et al. | 707/758 |

OTHER PUBLICATIONS

"A Web Services Implementation Framework for Financial Enterprise Content Management"; Kevin H.S. Kwok; Dickson K.W. Chiu; Proceedings of the 37th Hawaii International Conference on System Sciences—2004 IEEE.*

Chieu et al., "An Extensible Enterprise Content Management System with Service Component Architecture," Service Operations and Logistics, and Informatics, 2008. IEEE/SOLI 2008, Piscataway, NJ, USA, Oct. 12, 2008, pp. 1131-1137, XP031365747.

European Extended Search Report for Application No. 10007157.0-1238 dated Oct. 26, 2010, 7 pages.

* cited by examiner

INTEGRATION FRAMEWORK FOR ENTERPRISE CONTENT MANAGEMENT SYSTEMS

CROSS REFERENCE TO RELATED APPLICATIONS

The present application claims the benefit of Indian Patent Application No. 1123/CHE/2010, filed on Apr. 20, 2010, which is incorporated herein by reference in its entirety for all purposes.

FIELD

The present disclosure generally relates to an integration framework for enterprise content management systems.

BACKGROUND

A company may use a customer relationship management system to implement a strategy for managing the company's interactions with customers and sales prospects. The customer relationship management system may organize, automate, and synchronize business processes and handle sales related activities, marketing, customer service, and technical support. The company also may use an enterprise content management system to capture, manage, store, preserve, and deliver content and documents related to the company and its processes.

SUMMARY

In one aspect, a computer system includes at least one processor and at least one memory coupled to the at least one processor having stored thereon at least one user interface component configured to provide a user interface, multiple, different connector components configured to interface with multiple, different enterprise content management systems, and instructions which, when executed by the at least one processor, causes the at least one processor to perform operations. The operations include receiving, from a customer relationship management application, a request related to performing an operation associated with enterprise content management, and, in response to the request, providing, using the at least one user interface component, a standard user interface that includes a set of user interface elements that apply to operations performed by each of the multiple, different enterprise content management systems serviced by the computer system and that abstract out details of operations of any one of the multiple, different enterprise content management systems. The operations also include receiving user input that is entered into the standard user interface and that requests performance of an enterprise content management operation and, in response to the user input, identifying, from among the multiple, different enterprise content management systems, a particular enterprise content management system to perform the enterprise content management operation. The operations further include selecting, from among the multiple, different connector components, a particular connector component configured to interface with the particular enterprise content management system identified and using the particular connector component to interface with the particular enterprise content management system and control the particular enterprise content management system to perform the enterprise content management operation.

In another aspect, at least one computer-readable storage medium is encoded with executable instructions that, when executed by at least one processor, cause the at least one processor to perform operations. The operations include receiving, from a customer relationship management application, a request related to performing an operation associated with enterprise content management and, in response to the request, providing a standard user interface that includes a set of user interface elements that apply to operations performed by each of multiple, different enterprise content management systems serviced by the computer system and that abstract out details of operations of any one of the multiple, different enterprise content management systems. The operations also include receiving user input that is entered into the standard user interface and that requests performance of an enterprise content management operation and, in response to the user input, identifying, from among the multiple, different enterprise content management systems, a particular enterprise content management system to perform the enterprise content management operation. The operations further include selecting, from among multiple, different connector components configured to interface with the multiple, different enterprise content management systems, a particular connector component configured to interface with the particular enterprise content management system identified and using the particular connector component to interface with the particular enterprise content management system and control the particular enterprise content management system to perform the enterprise content management operation.

In yet another aspect, a computer-implemented method of integrating a customer relationship management application with an enterprise content management system includes receiving, by a computer system and from a customer relationship management application, a request related to performing an operation associated with enterprise content management and, in response to the request, providing, by the computer system, a standard user interface that includes a set of user interface elements that apply to operations performed by each of multiple, different enterprise content management systems serviced by the computer system and that abstract out details of operations of any one of the multiple, different enterprise content management systems. The method also includes receiving, by the computer system, user input that is entered into the standard user interface and that requests performance of an enterprise content management operation and, in response to the user input, identifying, from among the multiple, different enterprise content management systems, a particular enterprise content management system to perform the enterprise content management operation. The method further includes selecting, from among multiple, different connector components configured to interface with the multiple, different enterprise content management systems, a particular connector component configured to interface with the particular enterprise content management system identified and using, by the computer system, the particular connector component to interface with the particular enterprise content management system and control the particular enterprise content management system to perform the enterprise content management operation.

Implementations may include one or more of the following features. For example, the method may include identifying, from among the multiple, different enterprise content management systems, at least two enterprise content management systems to perform the enterprise content management operation and selecting, from among the multiple, different connector components configured to interface with the multiple, different enterprise content management systems, at least two connector components, each connector component being configured to interface with one of the at least two enterprise content management systems identified. In this example, the method may include using, by the computer system, the at least two connector components to interface with the at least two enterprise content management systems and control the at least two enterprise content management systems to perform the enterprise content management operation.

In addition, the method may include launching one or more user interface components based on one or more services in the customer relationship management application being invoked, and enabling the one or more services invoked in the customer relationship management application to consume web services offered by the particular enterprise content management system. The method also may include handling an event that results in a request to store data from the customer relationship management application in one or more of the multiple, different enterprise content management systems and, in response to the event, logging, in electronic storage separate from the customer relationship management application and the multiple, different enterprise content management systems, the event to identify the data from the customer relationship management application and the one or more of the multiple, different enterprise content management systems requested to store the data from the customer relationship management application.

In some implementations, the method may include, based on the logging, auditing the one or more of the multiple, different enterprise content management systems to determine whether the data from the customer relationship management application was properly stored in each of the one or more of the multiple, different enterprise content management systems. In these implementations, the method may include, in response to a determination that the data from the customer relationship management application was not properly stored in each of the one or more of the multiple, different enterprise content management systems, identifying at least one enterprise content management system in which the data from the customer relationship management application was not properly stored and taking corrective action with respect to the at least one enterprise content management system to cause proper storage of the data from the customer relationship management application in the at least one enterprise content management system. Further, in these implementations, the method may include calculating, based on the logging and auditing, integration statistics related to storage operations requested for each of the multiple, different enterprise content management systems and success or failure of the storage operations, generating a report that reflects the calculated integration statistics; and outputting, using an output device, the report.

In some examples, the method may include receiving user input related to a new enterprise content management system to integrate with the customer relationship management application and adding a new connector component configured to interface with the new enterprise content management system based on the user input. In these examples, the method may include updating integration rules to account for the new enterprise content management system based on the user input and handling integration of the customer relationship management application with the new enterprise content management system based on the new connector and the updated integration rules.

The method may include maintaining an existing connector component and existing integration rules for an existing enterprise content management system previously integrated with the customer relationship management application such that addition of the new enterprise content management system does not impact integration of the customer relationship management application with the existing enterprise content management system. The method also may include receiving, by the computer system and from the customer relationship management application, a second request related to performing an operation associated with the new enterprise content management system and, in response to the second request, providing the standard user interface used for the multiple, different enterprise content management systems to enable a user to provide input requesting performance of the operation associated with the new enterprise content management system using the same standard user interface used for the multiple, different enterprise content management systems prior to the addition of the new enterprise content management system.

In some examples, the method may include receiving user input defining one or more rules to apply in integrating the customer relationship management application with the particular enterprise content management system and defining, in electronic storage, the one or more rules for the particular enterprise content management system based on the received user input. In these examples, the one or more rules for the particular enterprise content management system may be applicable to integration operations associated with the particular enterprise content management system and inapplicable to integration operations associated with other of the multiple, different enterprise content management systems.

Also, the method may include identifying an integration operation that relates to the particular enterprise content management system, applying the one or more rules for the particular enterprise content management system to the integration operation based on the identification of the integration operation as relating to the particular enterprise content management system, and performing the integration operation that relates to the particular enterprise content management system based on the application of the one or more rules. The one or more rules for the particular enterprise content management system may include a first rule and the particular enterprise content management system may be a first enterprise content management system. The method may include receiving user input defining a second rule to apply in integrating the customer relationship management application with a second enterprise content management system, defining, in electronic storage, the second rule for the second enterprise content management system based on the received user input, identifying a target enterprise content management system for an integration operation, and determining whether the target enterprise content management system is the first enterprise content management system or the second enterprise content management system.

In response to a determination that the target enterprise content management system is the first enterprise content management system, the first rule for the first enterprise content management system is applied to the integration operation. In response to a determination that the target enterprise content management system is the second enterprise content management system, the second rule for the second enterprise content management system is applied to the integration operation.

In some examples, the one or more rules for the particular enterprise content management system may include a first rule that identifies types of documents to be transferred to the particular enterprise content management system. In these examples, the method may include handling a request to store a document in the particular enterprise content management system by determining a type of the document included in the request, comparing the determined type of the document to the types of documents identified by the first rule, and determining whether the determined type of the document is included in the types of documents identified by the first rule based on the comparison. In response to a determination that the determined type of the document is included in the types of documents identified by the first rule, the document is transferred to the particular enterprise content management system. In response to a determination that the determined type of the document is not included in the types of documents identified by the first rule, the request is handled without transferring the document to the particular enterprise content management system.

In some implementations, the one or more rules for the particular enterprise content management system may include a first rule that defines metadata handling for storing documents in the particular enterprise content management system. In these implementations, the method may include receiving a request to store a document in the particular enterprise content management system. The document may have a first set of metadata. In these implementations, the method may include converting the first set of metadata for the document to a second set of metadata appropriate for the particular enterprise content management system based on the first rule and storing the document in the particular enterprise content management system in association with the second set of metadata appropriate for the particular enterprise content management system.

Further, the one or more rules for the particular enterprise content management system may include a first rule that defines mapping of user privileges for access to documents in the particular enterprise content management system and the customer relationship management application. The method may include handling user access to the customer relationship management application and the particular enterprise content management system based on the first rule that defines mapping of user privileges for access to documents in the particular enterprise content management system and the customer relationship management application.

In addition, the one or more rules for the particular enterprise content management system may include a first rule that identifies a storage location in the particular enterprise content management system for storing documents from the customer relationship management application. The method may include receiving a request to store a document in the particular enterprise content management system, determining a location to store the document in the particular enterprise content management system based on the first rule that identifies the storage location in the particular enterprise content management system for storing documents from the customer relationship management application, and controlling the particular enterprise content management system to store the document in the determined location.

In some implementations, the one or more rules for the particular enterprise content management system may include a first rule that identifies file name conventions for naming documents from the customer relationship management application that are stored in the particular enterprise content management system. In these implementations, receiving a request to store a document in the particular enterprise content management system. The document may have a first file name. In these implementations, the method may include renaming the document to a second file name based on the first rule that identifies file name conventions, the second file name being different than the first file name, and controlling the particular enterprise content management system to store the document in the particular enterprise content management system using the second file name to identify the document.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

Like reference numbers represent corresponding parts throughout.

DETAILED DESCRIPTION

An enterprise integration system keeps business information consistent across different enterprise systems used by an organization, such as organizations which maintain customer data with a customer relationship management (CRM) application and product data with enterprise content management (ECM) repositories. The enterprise integration system acts as a broker between multiple systems and provides a common interface to enable multiple systems to interact and process instructions in a consistent manner. The enterprise integration system includes a framework of components that make enterprise system integration across CRM applications and ECM systems configurable and extensible.

Figure 1:
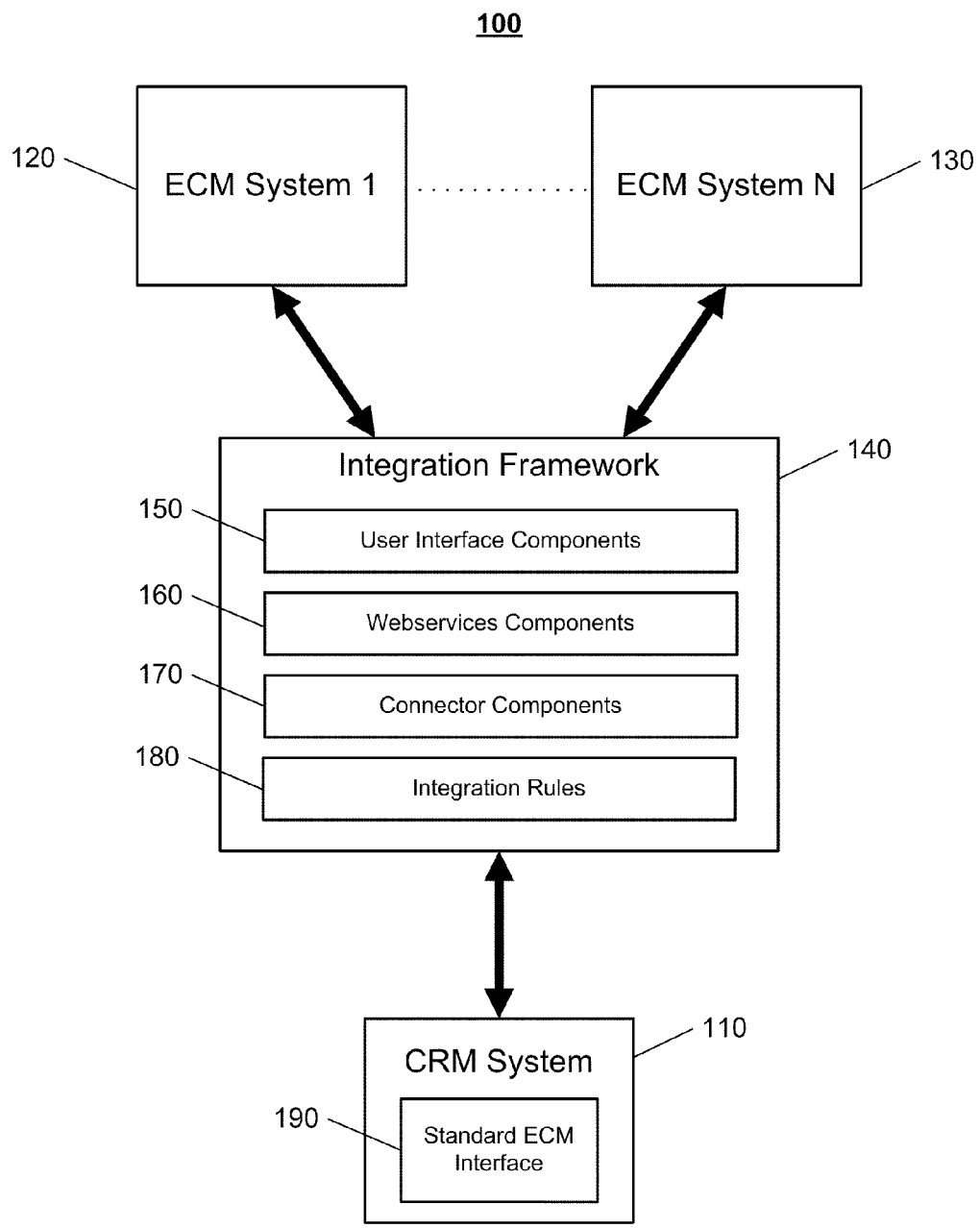
FIGS. 1-5, 7, 8, 10A-10C, 12, 14, and 17 are diagrams of exemplary systems.

FIG. 1 illustrates an example system 100 for integrating a customer relationship management (CRM) application with one or more enterprise content management (ECM) systems. For example, one or more CRM applications included in a CRM system 110 may be integrated with an ECM system 120 and/or an ECM system 130. The CRM system 110 may include functionality for organizing and automating various interactions with customers and sales prospects. For example, the CRM system 100 may include CRM applications which automate or synchronize business processes related to sales, marketing, customer service, and technical support.

The ECM systems 120 and 130 may be used, for example, to capture, manage, store, preserve, and deliver content and documents related to organizational processes of an organization. The ECM systems 120 and 130 may each include one or more ECM repositories. An ECM repository may include both structured data, such as database data, and unstructured information, such as documents, email messages, audio, and video. Structured and unstructured data may be tagged with metadata in the ECM systems 120 and 130. Each ECM system 120 and 130 may be accessed through a different API (Application Programming Interface).

A CRM application included in the CRM system 110 may request to perform an operation associated with enterprise content management. For example, a CRM application running on the CRM system 110 may request to access information from one or more ECM repositories included in one or more of the ECM systems 120 and 130. The CRM application may access the ECM systems 120 and 130 through the use of an integration framework 140.

The integration framework 140 provides a standard ECM interface 190 for CRM applications to use when accessing the ECM systems 120 and 130. The standard ECM interface 190 hides connection and API differences between the ECM systems 120 and 130. Rather than interface to multiple, different ECM interfaces, a CRM application can interface to the standard ECM interface 190 to provide a consistent experience regardless of which ECM system is being accessed. Access to an ECM system may include retrieving data (e.g., content) from the ECM system and storing data (e.g., content) to the ECM system.

The integration framework 140 includes one or more user interface components 150, one or more webservices components 160, one or more connector components 170, and one or more sets of integration rules 180. In response to the request from the CRM application, one or more user interface components 150 may be launched. The user interface components 150 may be launched to provide the standard ECM interface 190 used by CRM applications. The standard ECM interface 190 may allow a user to request performance of ECM operations such as searching, browsing, navigating, importing, and creating new documents. The user-requested operations may be performed by one or more ECM systems. The user interface components 150 provide a standard interface which abstracts out details of operations of any one ECM system. Accordingly, the user may not be concerned with (and may not be aware of) which ECM system performs the operation or which commands and input are needed to perform a generic operation in the ECM system.

ECM functionalities may be performed by one or more webservices components 160. The webservices components 160 provide an abstraction which hides ECM-system specific service invocation details. The webservices components 160 expose a standardized set of ECM functionalities to CRM services. A CRM service encapsulates a set of CRM functionality, such as converting and moving data between a CRM application and the ECM system 120 or the ECM system 130. CRM services may perform ECM functionality by consuming services offered by the webservices components 160.

The webservices components 160 and the user interface components 150 may use one or more connector components 170 to connect to the ECM system 120 or the ECM system 130. A connector component 170 is configured to interface with a particular ECM system. For example, a first connector component 170 may be configured to connect to the ECM system 120 and a second connector component 170 may be configured to connect to the ECM system 130.

The integration rules 180 define rule related to integrating a CRM application with a particular ECM system. For example, rules may be defined to identify types of documents to be transferred to a particular ECM system, to define metadata handling for storing documents in the particular ECM system, to define mapping of user privileges for access to documents in the particular ECM system and in the CRM application, to identify a storage location in the particular ECM system for storing documents from the CRM application, and to identify file name conventions for naming documents from the CRM application that are to be stored in the particular ECM system.

The integration rules 180 may have general rules that apply to all ECM systems and/or specific rules that apply to specific ECM systems. The specific rules allow for different operations to be performed when integrating a CRM application with different ECM systems.

Figure 2:
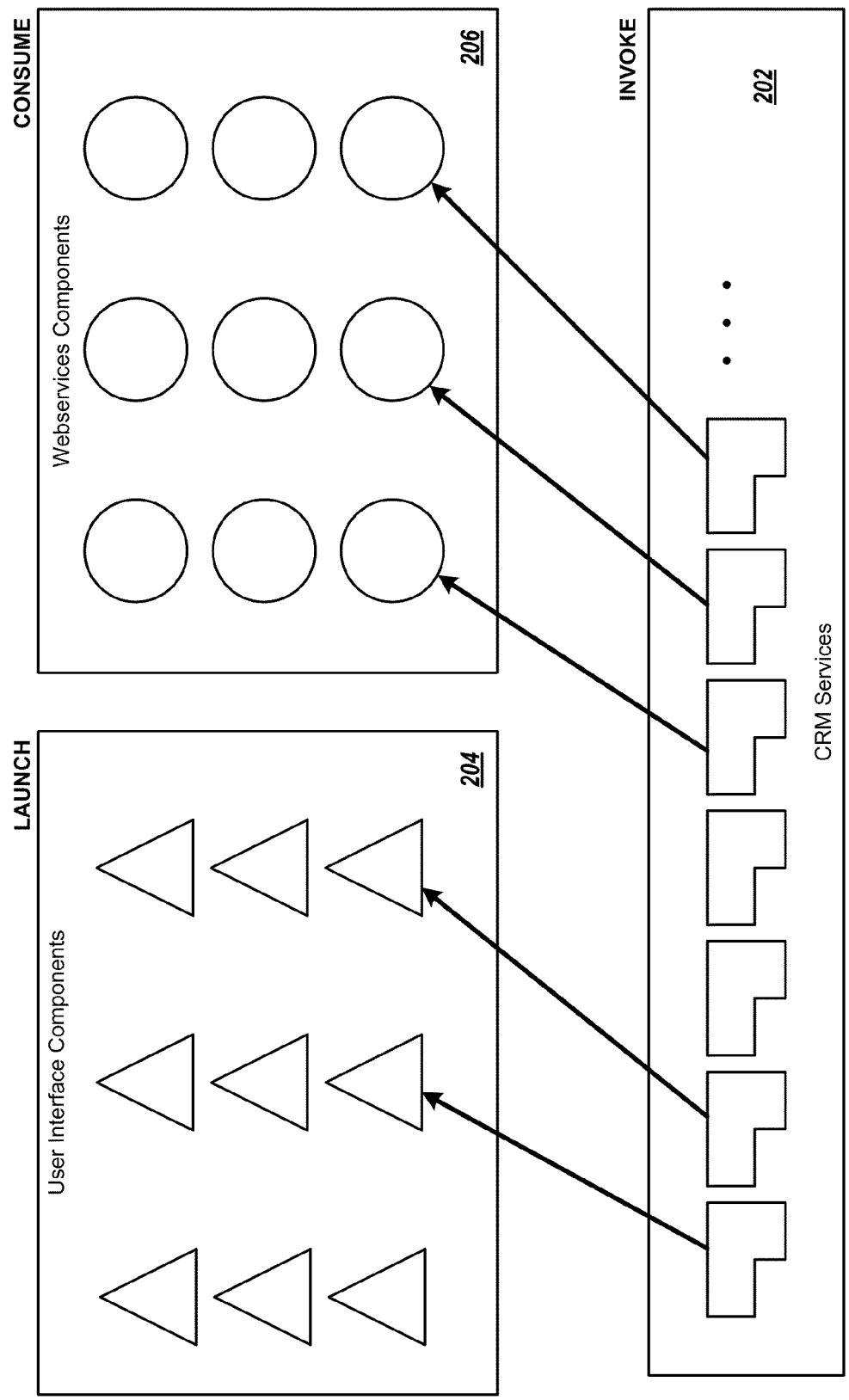

As shown in FIG. 2, a CRM service 202 may, in response to being invoked, launch one or more user interface components 204 and may consume one or more webservices 206. Thus, the CRM services 202, the user interface components 204, and the webservices components 206 form an invoke-launch-consume execution pattern. As described above, the user interface components 204 provide a standard user interface for initiating ECM operations, regardless of which ECM system is accessed, and the webservices components 206 provide a generic set of API services which hide specific details of accessing various ECM systems.

In some examples, the CRM services 202 act as a place holder to launch the one or more user interface components 204 (e.g., Java 2 Platform, Enterprise Edition (J2EE) Components) and to consume the webservices components 206 (e.g., ECM Webservices). The one or more user interface components 204 act as user Interface components to perform operations like search, browse, navigation, import and create new documents. The webservices components 206 provide a generic set of API (Application Programming Interface) services to perform single sign on, file transfer and metadata fetching & updating.

Figure 3:
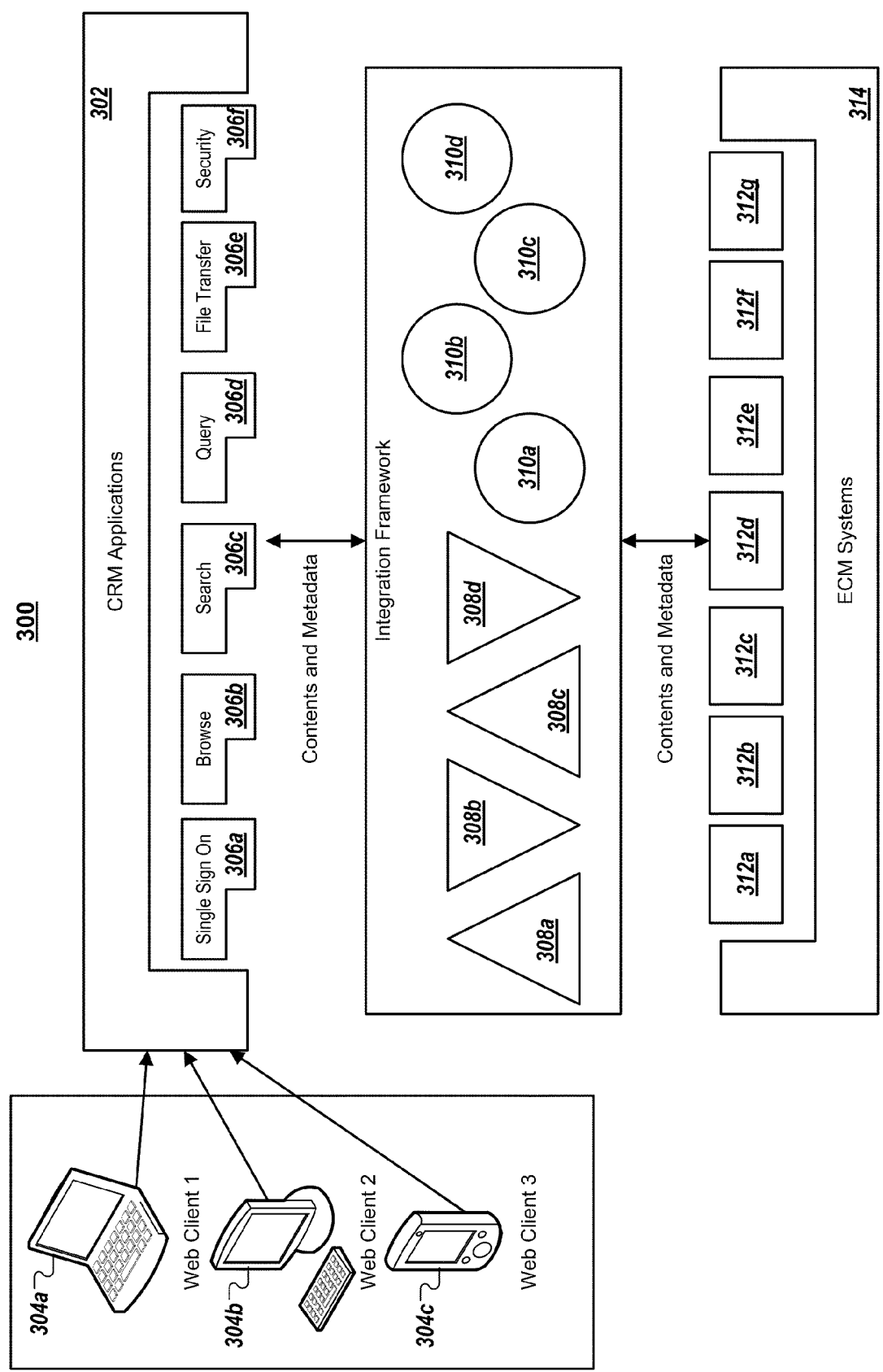

In further detail and as shown in FIG. 3, a CRM application 302 may be invoked by one or more web clients 304a, 304b, and 304c. A CRM application 302 may provide functionality through one or more CRM services 306a-306f. The CRM services 306a-306f may include, for example, single sign-on, browsing, searching, querying, file transfer, or security functions.

A CRM service 306 may, in response to being invoked, launch one or more user interface components 308a-308d and may consume one or more webservices 310a-310d. A new thread may be created each time one of the CRM services 306a-306f is invoked. The user interface components 308a-d and the webservices 310a-d interface with one or more connector components 312a-312g, where each connector component 312a-312f is configured to interface with a particular ECM system 314.

The user interface components 308a-308d may include, for example, a login component, a grid browser component, a tree browser component, a search component, and a properties component. A login component may be launched, for example, if the user is not logged into an ECM system when a CRM service 306a-306f is invoked. A grid browser component may be used to allow a user to view table-based data (e.g., database-related data) from one or more ECM repositories. A tree browser component may be used to enable a user to navigate a hierarchical view of ECM data, and to expand or collapse different levels of the hierarchical view. A search component may allow a user to initiate a search of one or more ECM repositories for one or more user-entered search terms and to browse returned search results. A properties component may enable a user to view or modify metadata for a document stored in an ECM repository. In some implementations, the user interface components 306a-306f are implemented using J2EE (Java Two Platform, Enterprise Edition) technology.

The webservices components 310a-310d provide an abstraction which hides ECM-system specific service invocation details. In some implementations, the webservices components 310a-310d expose ECM functionalities to the CRM applications 302 using SOAP (Simple Object Access Protocol). The webservices components 310a-310d may include, for example, a single sign-on service, a browse service, a search service, a metadata service, a file transfer service, and a query service.

The single sign-on service may expose one or more methods to sign into or sign out of an ECM repository from a CRM application 302. The browse service may expose a set of methods for browsing or navigating ECM repositories in a hierarchical manner. The search service may expose a set of methods for searching one or more ECM repositories for one or more stored documents. The metadata service may expose a set of methods for updating metadata information in ECM repositories. The file transfer service may expose a set of methods for transferring documents across ECM systems 314 and CRM applications 302. The query service may expose a set of methods to execute queries in ECM repositories.

Figure 4:
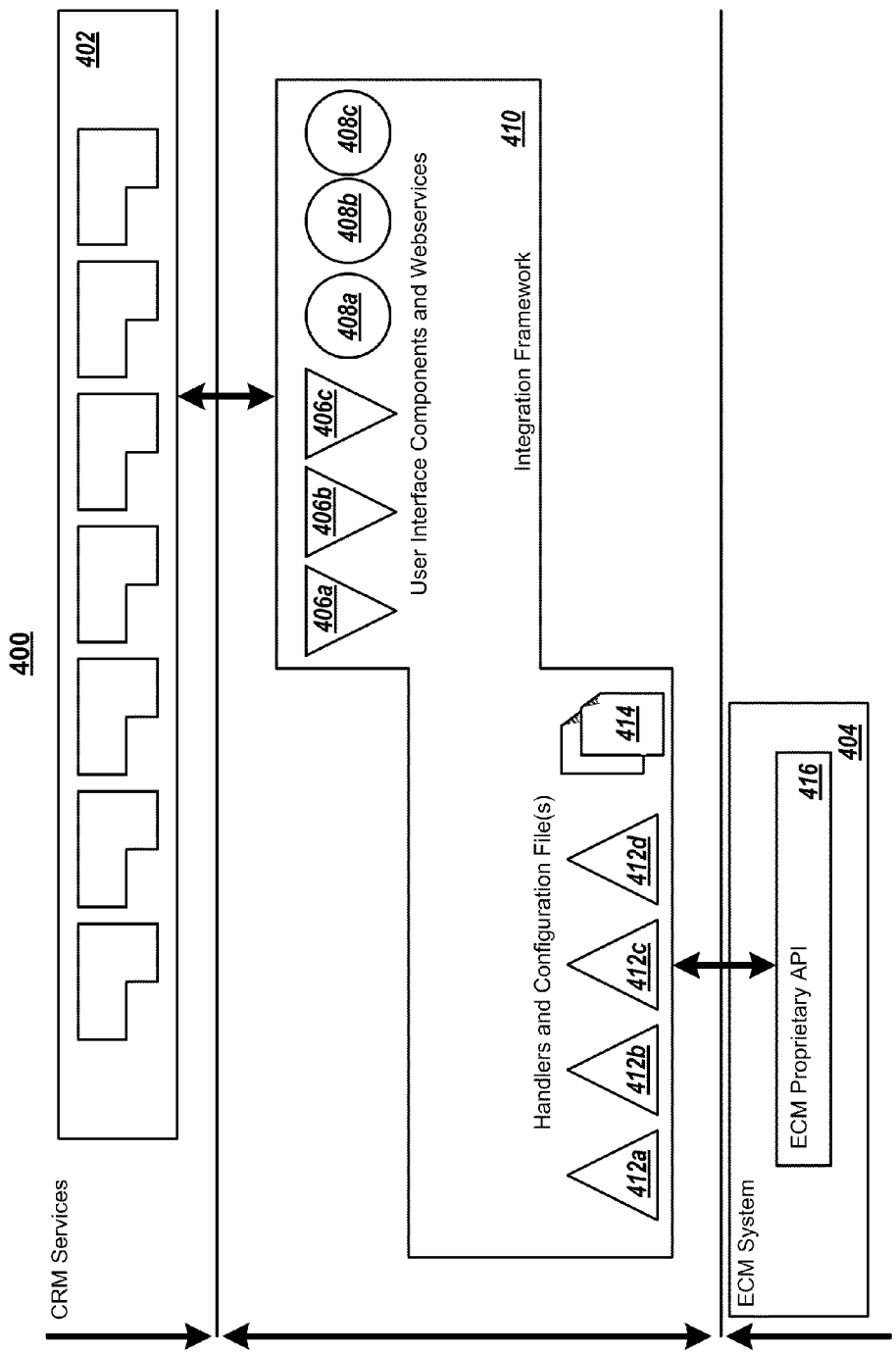

FIG. 4 illustrates an example system 400 for integrating one or more CRM services 402 with an ECM system 404. A CRM service 402 may, in response to being invoked, launch one or more user interface components 406a, 406b, and 406c and may consume one or more webservices 408a, 408b, and 408c, where the user interface components 406a, 406b, and 406c and the webservices components 408a, 408b, and 408c are included in an integration framework 410. The integration framework 410 also includes handlers 412a-412d and one or more configuration files 414. The handlers 412a-412d may be used by the user interface components 406a, 406b, and 406c and the webservices components 408a, 408b, and 408c.

The one or more configuration files 414 may define configuration details for the handlers 412a-412d. The handlers 412a-412d may leverage the one or more configuration files 414 in handling operations. As such, editing the one or more configuration files 414 enables reconfiguration of the functionality of the handlers 412a-412d. The one or more configuration files 414 may be XML (Extensible Markup Language) files that allow for relatively easy editing.

In some implementations, a handler 412 (e.g., one of the handlers 412a-412d) is exposed by a connector component (e.g., connector component 312a shown in FIG. 3). A handler 412 may be used to perform an operation in an ECM repository. For example, types of handlers 412 may include configuration handlers, connection handlers, navigation handlers, tag handlers, query handlers, file transfer handlers, and object handlers. A configuration handler may be used to add, edit, or delete configuration information, such as access details or ECM folder details. A connection handler may be used for creating and managing a session with an ECM repository. A navigation handler may be used to access artifacts in an ECM repository, such as cabinets, folders, or documents. A query handler may be used to query an ECM repository. A file transfer handler may be used to transfer files across CRM applications and ECM repositories. An object handler may be used to access an object included in an ECM repository.

A handler 412 also may be configured to interface with a particular ECM system 404. For instance, the handler 412 may be configured to communicate with the particular ECM system using a proprietary API 416 of the ECM system. The use of multiple handlers may enable interfacing to multiple ECM systems. To interface to a new ECM system, a new set of handlers may be implemented.

The one or more configuration files 414 may define configuration details for the handlers 412a-412d. The handlers 412a-412d may leverage the one or more configuration files 414 in handling operations. As such, editing the one or more configuration files 414 enables reconfiguration of the functionality of the handlers 412a-412d. The one or more configuration files 414 may be XML (Extensible Markup Language) files that allow for relatively easy editing.

Figure 5:
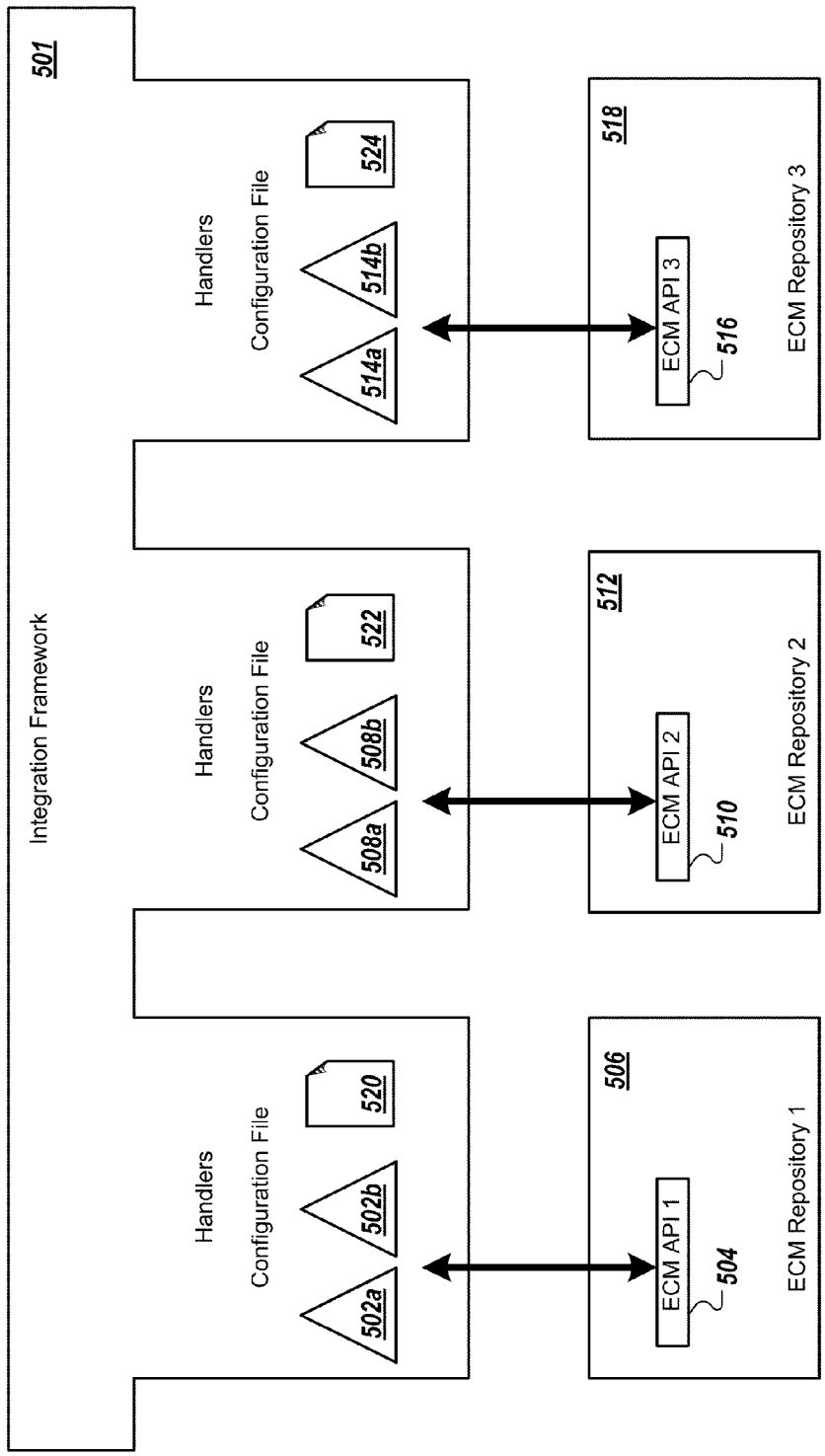

FIG. 5 illustrates an example integration framework 501 which includes handler components 502a and 502b configured to interface with an API 504 included in an ECM system 506, handler components 508a and 508b configured to interface with an API 510 included in an ECM system 512, and handler components 514a and 514b configured to interface with an API 516 included in an ECM system 518.

The integration framework 501 includes configuration files 520, 522, and 524. A configuration file may include configuration information about a particular ECM system, such as information about an ECM repository included in the ECM system. In the example of FIG. 5, each of the configuration files 520, 522, and 524 is associated with one of the ECM systems 506, 512, and 518, respectively. For example, the configuration file 520 may include configuration information for the ECM system 506, the configuration file 522 may include configuration information for the ECM system 512, and the configuration file 524 may include configuration information for the ECM system 518.

A configuration file may include, for example, package and class name information about handler classes used to access a particular ECM system, connection details for connecting to a particular ECM system, references to folder path names included in an ECM repository, ECM repository query details, ECM repository script details, or other custom information related to a particular ECM repository or system. In some implementations, multiple sets of configuration information for multiple ECM systems may be included in a single configuration file or multiple configuration files. In some implementations, a configuration file is implemented as an XML (eXtensible Markup Language) file.

Figure 6:
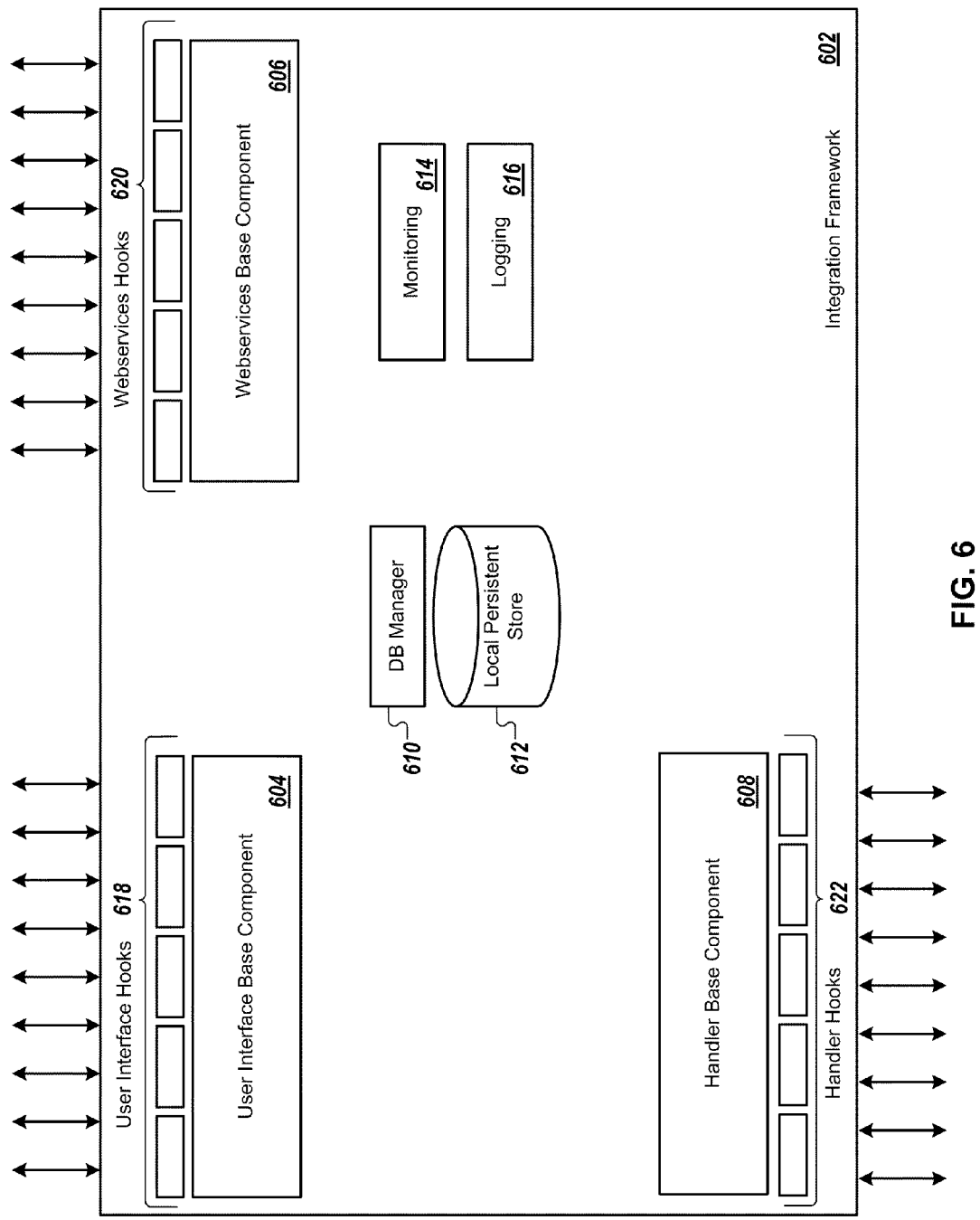
FIG. 6 is a diagram of an exemplary integration framework.

FIG. 6 illustrates example components of an integration framework 602. As discussed above, an integration framework may include user interface components, webservices components, and connector components and associated handlers. The integration framework 602 also may include other components.

As shown in FIG. 6, the integration framework 602 may include a user interface base component 604, a webservices base component 606, a handler base component 608, a database manager 610, a local persistent data store 612, a monitoring component 614, a logging component 616, one or more user interface hook components 618, one or more webservices hook components 620, and one or more handler hook components 622.

The handler base component 608 is configured to parse a configuration file (e.g., the configuration file 524 shown in FIG. 5) and to orchestrate the handler hook components 622. A handler hook component 622 invokes a handler for a particular ECM system. In some implementations, handler components (e.g., handler 502a, FIG. 5) are derived from or are otherwise associated with the handler base component 608.

The user interface base component 604 is configured to orchestrate the user interface hook components 618 and to communicate with the handler base component 608. The user interface hook components 618 are used by user interface components to access an ECM repository. In some implementations, user interface components (e.g., user interface component 406a, FIG. 4) are derived from or are otherwise associated with the user interface base component 604.

The webservices base component 606 is configured to orchestrate the webservices hook components 620 and to communicate with the handler base component 608. A webservices hook component 620 is used by a webservices component to access an ECM repository. In some implementations, webservices components (e.g., webservice 408a, FIG. 4) are derived from or are otherwise associated with the webservices base component 606.

The local persistent data store 612 may be used for storing ECM configuration details and other configuration data, such as data used for performance tuning. The database manager 610 is a software component which may be used to provide and manage access to the local persistent data store 612.

The monitoring component 614 may be used for monitoring CRM application and ECM system integration. For example, the monitoring component 614 may provide access to one or more information feeds and enable monitoring of integration operations using the one or more information feeds.

The logging component 616 may be used to log information associated with integrating a CRM application with one or more ECM systems. In some implementations, the logging component 616 may use the "log4j" (Logging For Java) API. The logging component 616 may log, in the local persistent data store 612, records of integration operations performed by the integration framework 602

Figure 7:
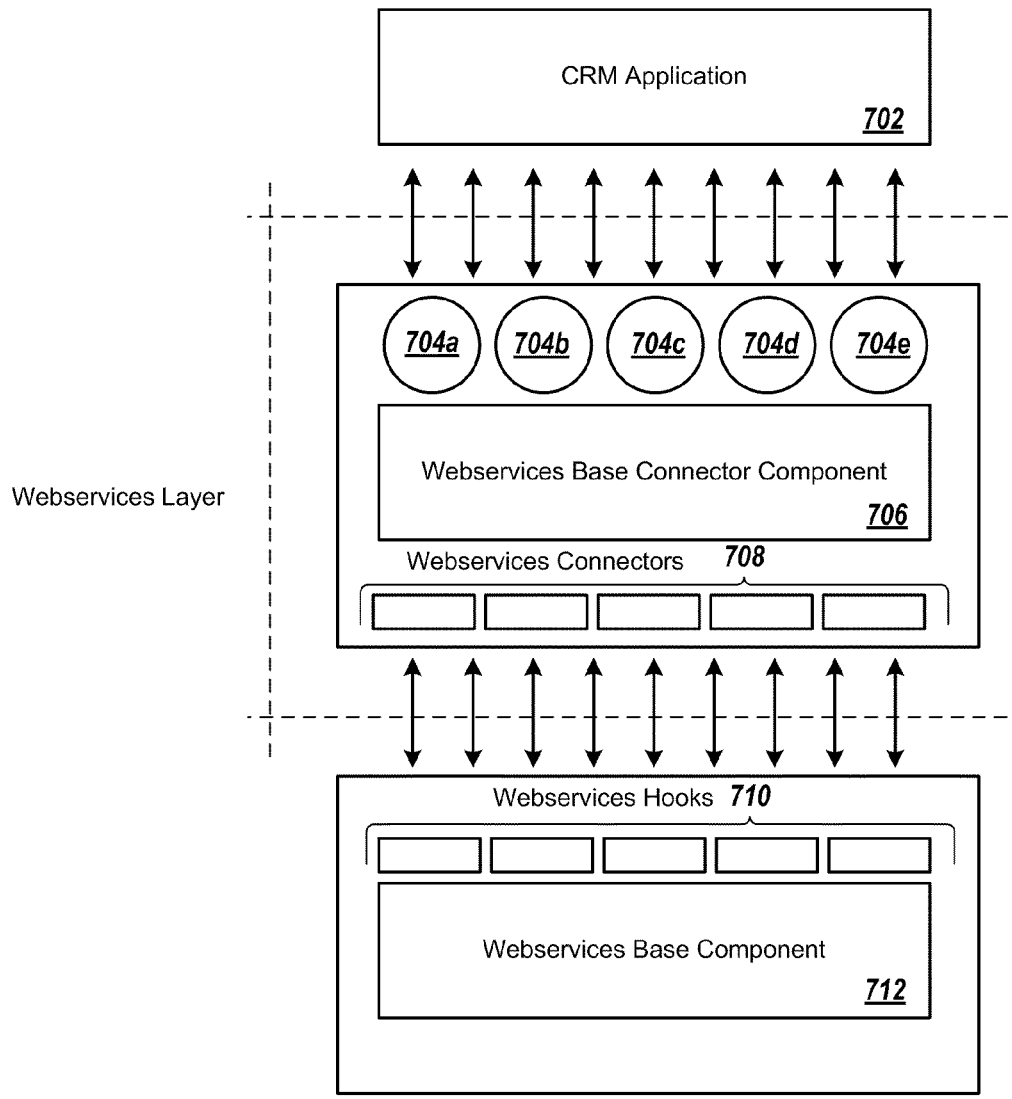

FIG. 7 illustrates an example webservices layer of an integration framework. A CRM application 702 may consume one or more webservices components 704a-704e. A webservice component 704a-704e may interface with a webservices base connector component 706. The webservices base connector component 706 may act as a layer between the webservices components 704a-704e and connector components 708. The webservices base connector component 706 may receive a call from a webservices component 704a-704e and may route the call to an appropriate webservices connector component 708. A connector component 708 may be associated with a corresponding webservices hook component 710. A connector component 708 and a corresponding webservices hook component 710 may interact to access an ECM repository. As mentioned above, the webservices hook components 710 are orchestrated by a webservices base component 712.

Figure 8:
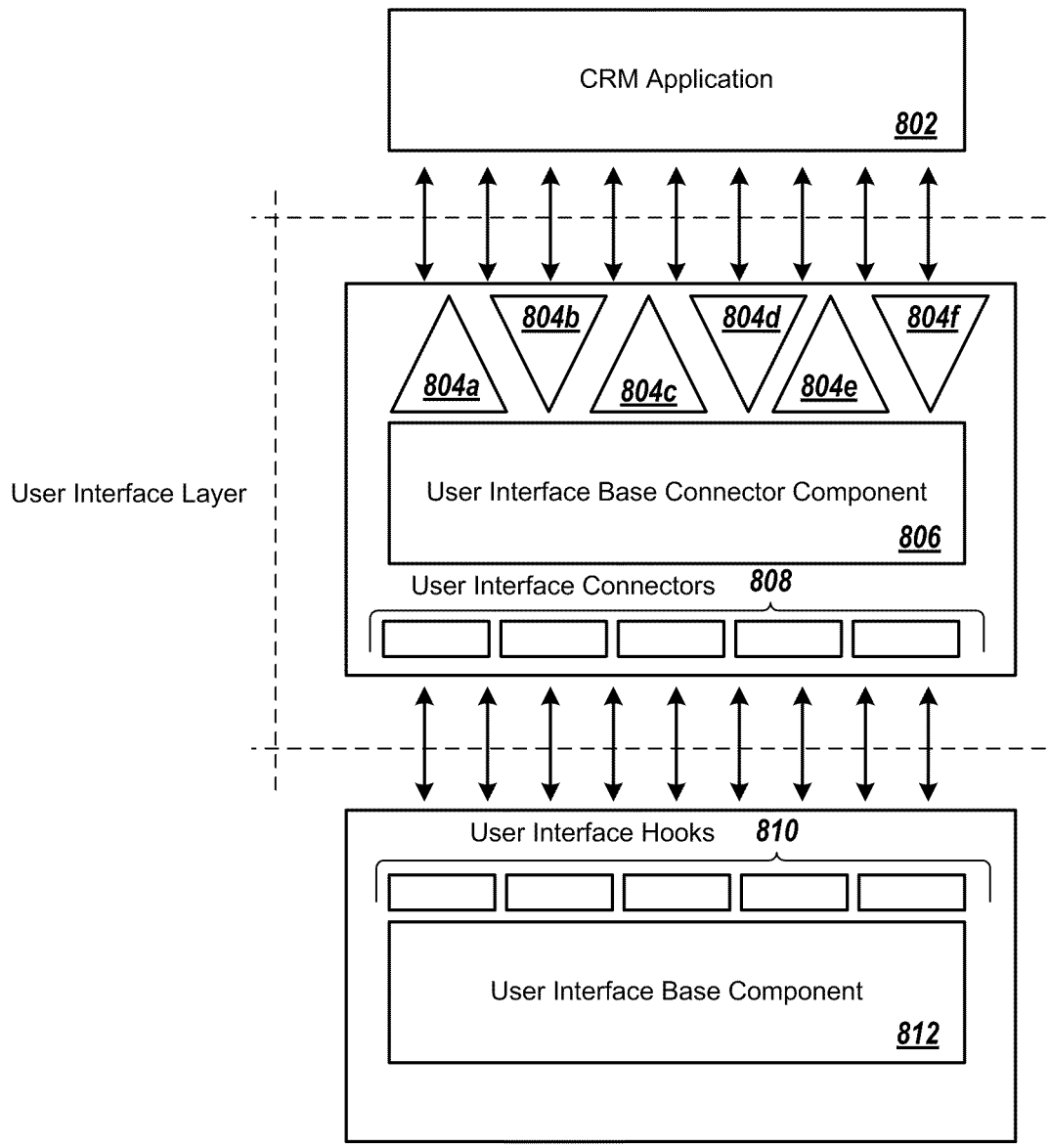

FIG. 8 illustrates an example user interface layer of an integration framework. A CRM application 802 may launch one or more user interface components 804a-804f. A user interface component 804a-804f may interface with a user interface base connector component 806. The user interface base connector component 806 may act as a wrapper for user interface connector components 808. The user interface base connector component 806 may receive a call from a user interface component 804a-804f and may route the call to an appropriate user interface connector component 808. A user interface connector component 808 interacts with a corresponding user interface hook component 810 to process a particular ECM operation in a particular ECM repository. As mentioned above, a user interface base component 812 orchestrates the user interface hook components 810.

Figure 9:
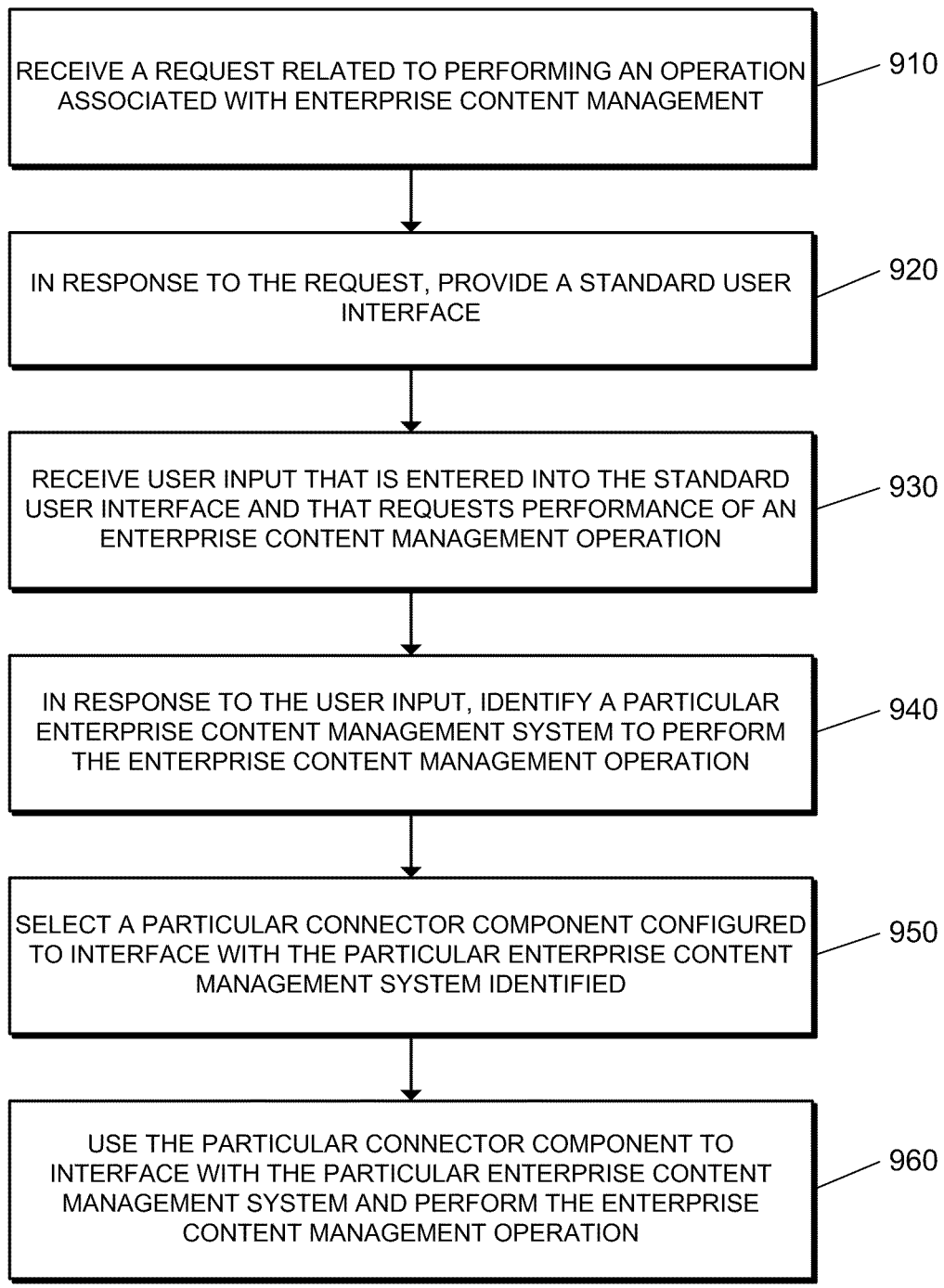
FIGS. 9, 11, 13, and 15 are flowcharts of exemplary processes.

FIG. 9 illustrates an example process 900 for integrating a customer relationship management application with an enterprise content management system. The operations of the process 900 are described generally as being performed by the system 100. The operations of the process 900 may be performed by one of the components of the system 100 (e.g., the integration framework 140) or may be performed by a combination of the components of the system 100. In some implementations, operations of the process 900 may be performed by one or more processors included in one or more electronic devices.

Figure 10A:
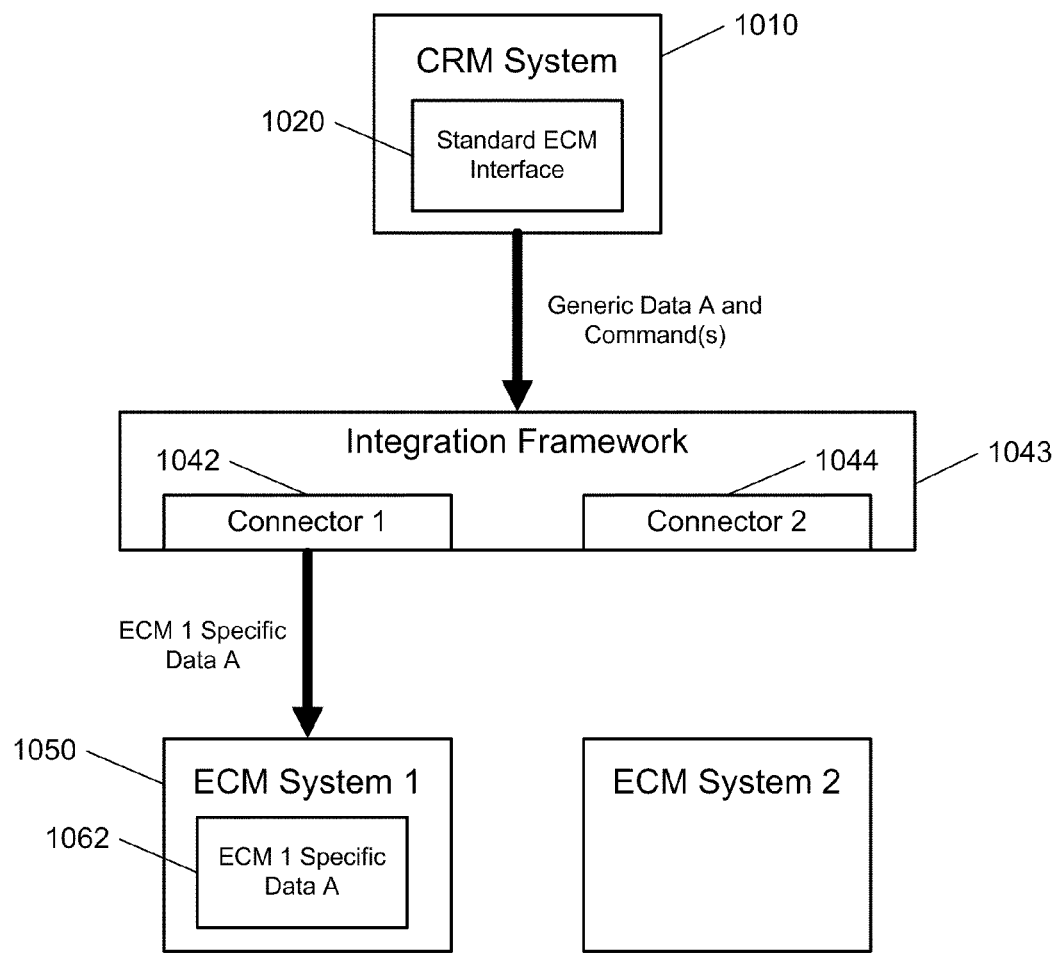

The system 100 receives a request related to performing an operation associated with enterprise content management (910). For example, the system 100 may receive a request from a CRM application. As shown in FIG. 10A, a request from a CRM application included in a CRM system 1010 may be received.

The request may be a request based on user input provided to the CRM application to perform an operation associated with enterprise content management. For instance, a user may provide, to the CRM application, user input requesting storage of content from the CRM application in an ECM system. In response to the user input, the CRM application sends a request to perform an operation related to storing the content from the CRM application in the ECM system.

The request also may be a request automatically generated by the CRM application without user intervention. For instance, the CRM application may analyze actions being performed by the CRM application and, based on the analysis, determine that content from an ECM system may be useful to a user interacting with the CRM application. In response to a determination that content from an ECM system may be useful to a user interacting with the CRM application, the CRM application automatically, without user intervention, sends a request related to accessing the relevant content from the ECM system.

In response to the request, the system 100 provides a standard user interface (920). The standard user interface may include a set of user interface elements that apply to operations performed by each of multiple, different enterprise content management systems serviced by the computer system and that abstract out details of operations of any one of the multiple, different enterprise content management systems. For instance, in the example of FIG. 10A, a standard ECM interface 1020 may be provided in a CRM application included in the CRM system 1010. Providing the standard user interface may include launching one or more user interface components (e.g., the user interface component 308a discussed above with respect to FIG. 3). The user interface components may be launched, for example, in response to one or more services in the CRM application being invoked. The launching of the user interface components may enable the one or more CRM services to consume one or more web services offered by a particular enterprise content management system.

The system 100 receives user input that is entered into the standard user interface and that requests performance of an enterprise content management operation (930). For example, a user may interact with a user interface component, such as a grid browser component, a tree browser component, a search component, or a properties component. The user input received from the CRM system 1010 may include generic data and commands (e.g., data and commands not specific to any ECM system).

In response to the user input, the system 100 identifies a particular enterprise content management system to perform the enterprise content management operation (940). The particular ECM system may be identified from among multiple, different ECM systems. For example, the system 100 may automatically identify a particular ECM system by referencing an entry in a configuration file to determine to which one or more enterprise content management systems the operation pertains. The system 100 also may identify the particular enterprise content management system based on user input provided by a user selecting an appropriate enterprise content management system for the operation.

The system 100 selects a particular connector component configured to interface with the particular enterprise content management system identified (950). For example, the system 100 may select a particular connector component by identifying one or more entries in a configuration file corresponding to the identified enterprise content management system. For example, a configuration file may include one or more entries which identify attributes of a connector component such as a class name and a package name.

Figure 10B:
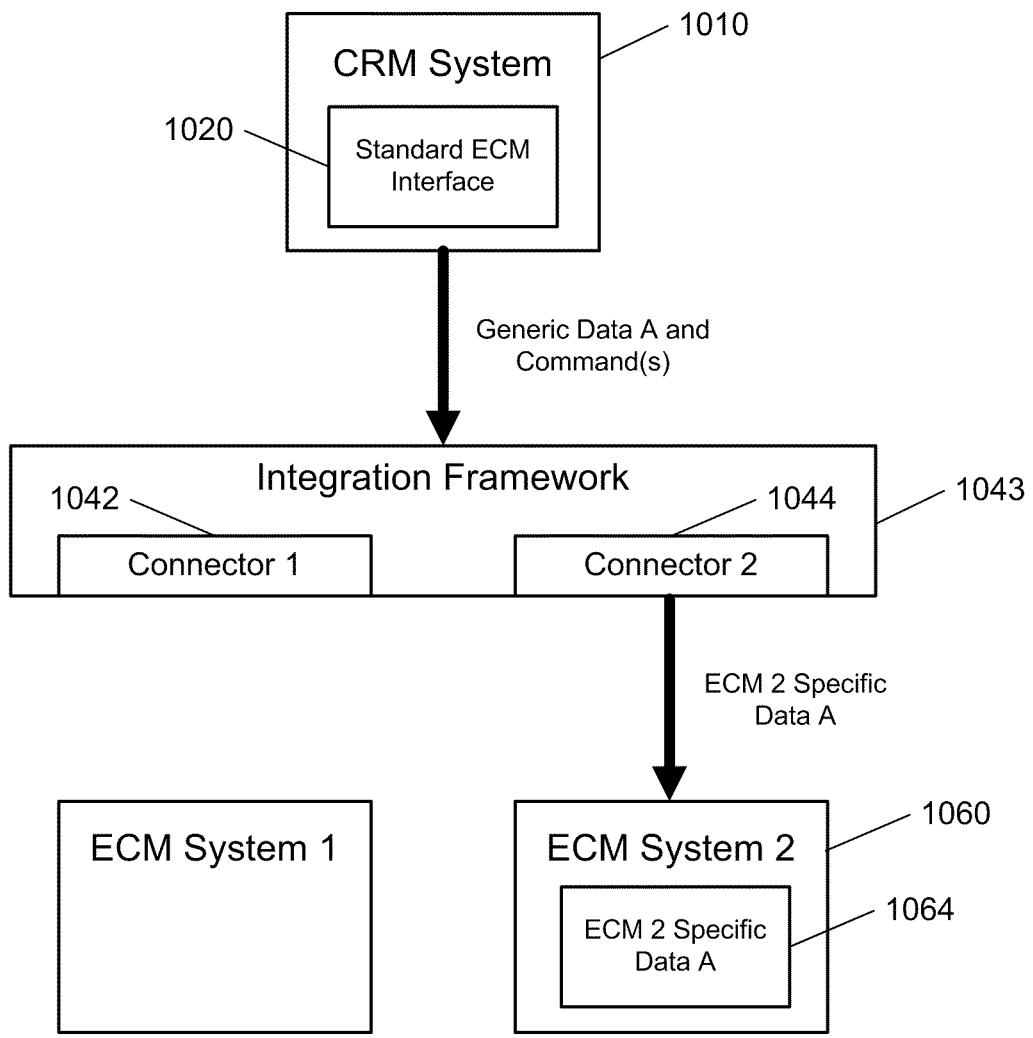

In the example of FIG. 10A, a connector component 1042 may be identified from a set of connector components included in an integration framework 1043 which includes other connector components, such as a connector component 1044. The connector component 1042 is configured to interface with an ECM system 1050. As another example and as shown in FIG. 10B, the connector component 1044 may be identified. The connector component 1044 is configured to interface with an ECM system 1060.

Returning to FIG. 9, the system 100 uses the particular connector component to interface with the particular enterprise content management system and perform the enterprise content management operation (960). For instance, the system 100 may use the particular connector component to retrieve data (e.g., content) from the particular enterprise content management system or to store data (e.g., content) in the particular enterprise content management system.

In the example of FIG. 10A, the connector component 1042 may be used to perform an ECM operation in the ECM system 1050. The connector component 1042 may be configured to interface with an API used by the ECM system 1060 and may provide data 1062 specific to the ECM system 1050. The data 1062 specific to the ECM system 1050 may have been converted to a format specific to the ECM system 1050 by the integration framework 1043.

In the example of FIG. 10B, the connector component 1044 may be used to perform an ECM operation in the ECM system 1060. The connector component 1044 may be configured to interface with an API used by the ECM system 1060 and may provide data 1064 specific to the ECM system 1060. The data 1064 specific to the ECM system 1060 may have been converted to a format specific to the ECM system 1060 by the integration framework 1043. The data 1064 specific to the ECM system 1060 (or its format) may be different than the data 1062 specific to the ECM system 1050 (or its format).

Figure 10C:
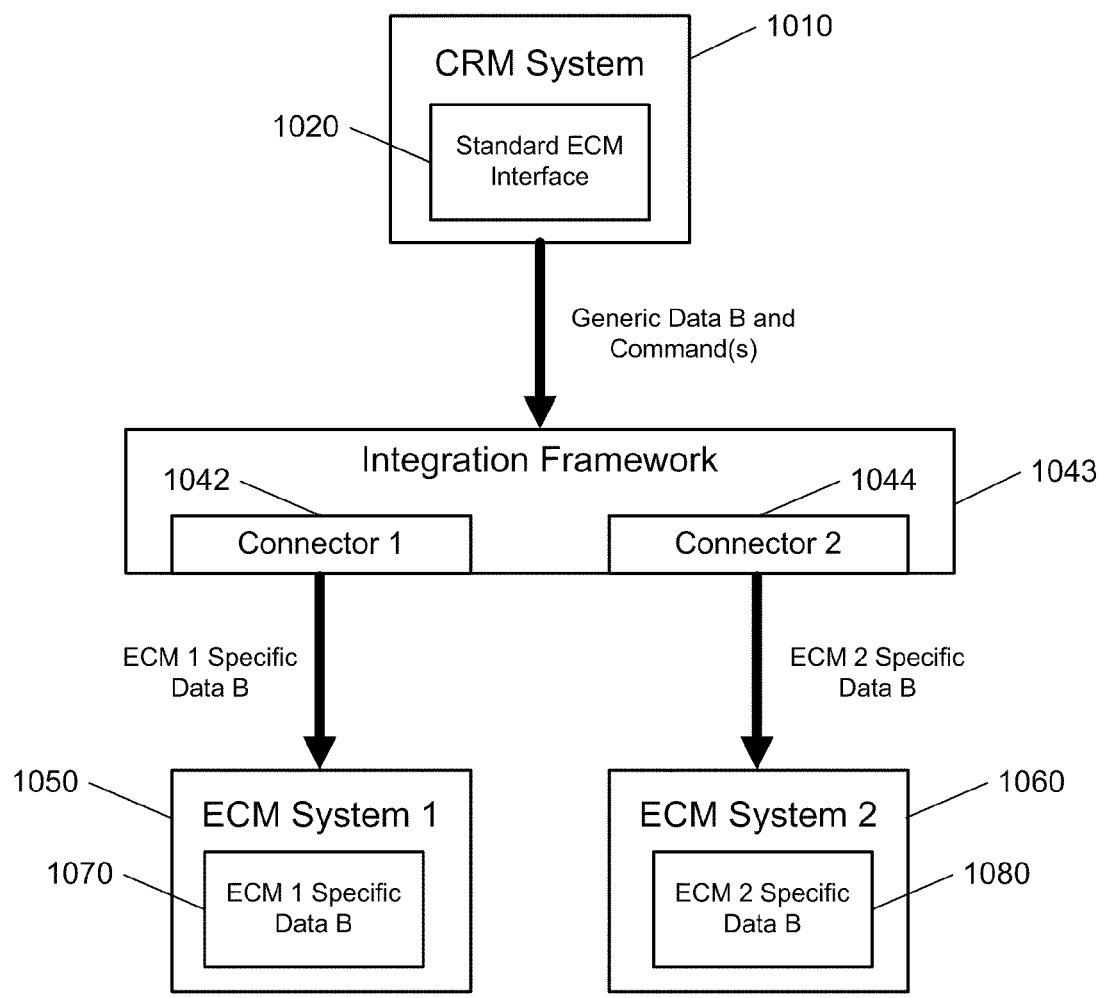

In some implementations and for some CRM services, the system 100 may identify more than one ECM system to perform a requested ECM operation. For example and as illustrated in FIG. 10C, both the ECM system 1050 and the ECM system 1060 may be identified. The connector components 1042 and 1044 each may be selected to interface with the ECM systems 1050 and 1060, respectively. The connector component 1042 may be used to send data 1070 to the ECM system 1050, where the data 1070 is specific to the ECM system 1050. Similarly, the connector component 1044 may be used to send data 1080 to the ECM system 1060, where the data 1080 is specific to the ECM system 1060. The data 1070 specific to the ECM system 1050 (or its format) may be different than the data 1080 specific to the ECM system 1060 (or its format). The integration framework 1043 may convert the data from the CRM application to the formats needed by the ECM systems 1050 and 1060 based on integration rules. More than one ECM system may be requested to perform an ECM operation when data (e.g., content) is stored in multiple ECM systems. More than one ECM system also may be requested to perform an ECM operation when data (e.g., content) is needed to be accessed from multiple ECM systems.

Figure 11:
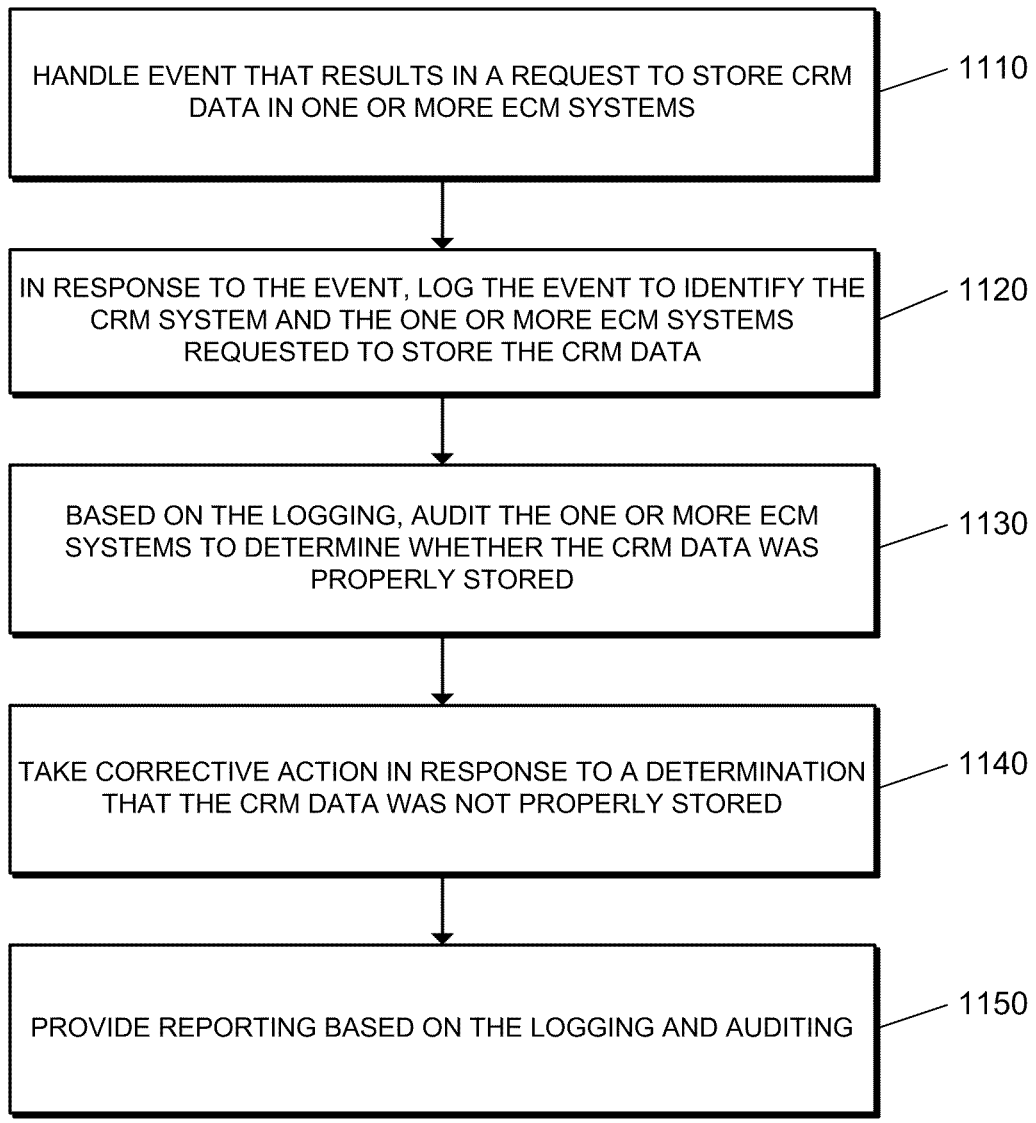

FIG. 11 illustrates an example process 1100 for logging and auditing operations related to integrating a customer relationship management application with an enterprise content management system. The operations of the process 1100 are described generally as being performed by the system 100. The operations of the process 1100 may be performed by one of the components of the system 100 (e.g., the integration framework 140) or may be performed by a combination of the components of the system 100. In some implementations, operations of the process 1100 may be performed by one or more processors included in one or more electronic devices.

Figure 12:
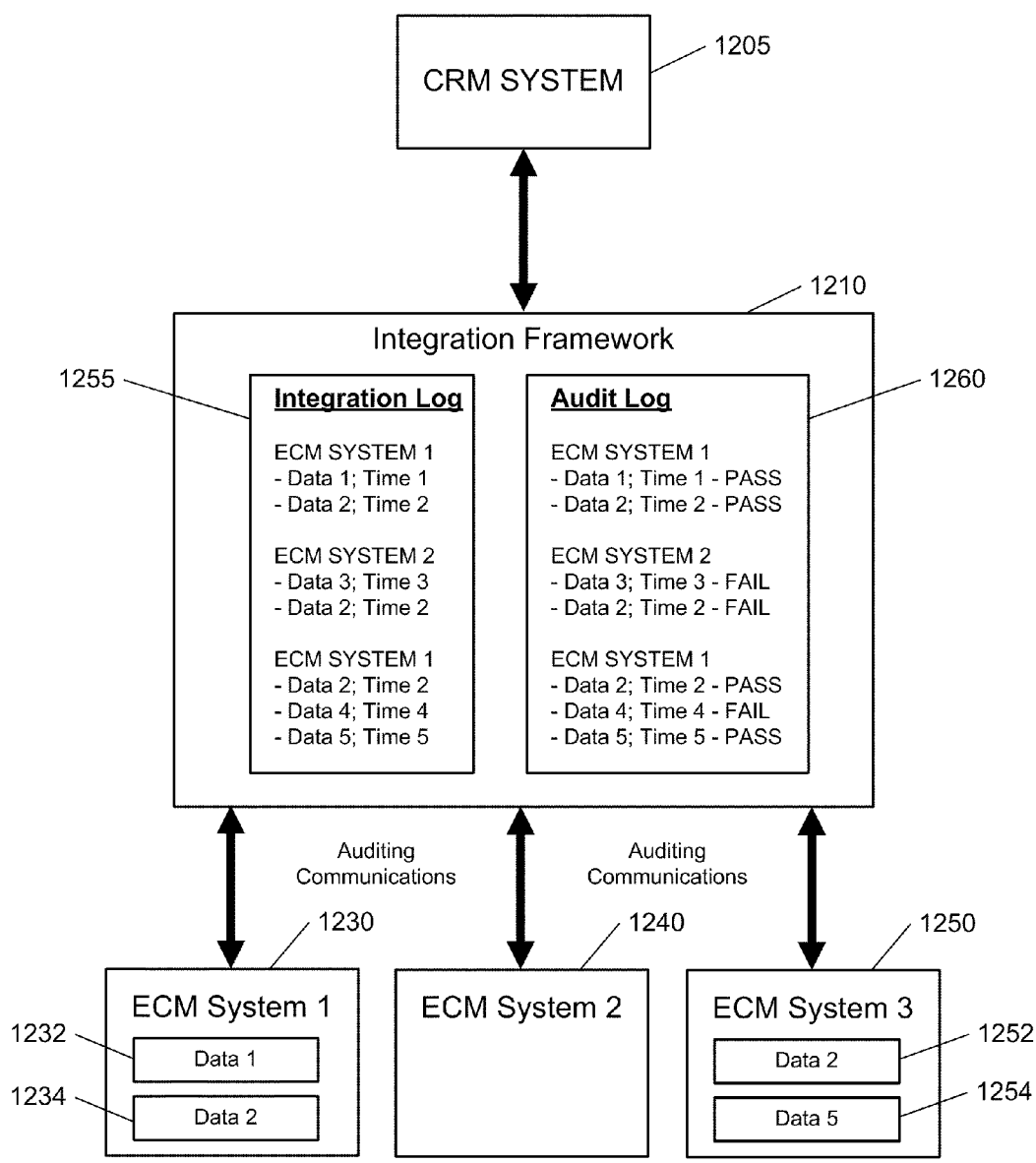

The system 100 handles an event that results in a request to store CRM data in one or more ECM systems (1110). For example, a CRM application integrated with one or more ECM systems through an integration framework may request to store CRM data in one or more ECM systems. For example and as shown in FIG. 12, a CRM system 1205 may request, using an integration framework 1210, to store CRM data in one or more of ECM systems 1230, 1240, and 1250. The request to store CRM data in one or more of the ECM systems 1230, 1240, and 1250 may be based, for example, on a user interface event received from a user interface component displayed in a CRM application included in the CRM system 1205.

Returning to FIG. 11, in response to the event, the system 100 logs the event to identify the CRM system and the one or more ECM systems requested to store the CRM data (1120). Logging may be performed, for example, by the logging component 616 described above with respect to FIG. 6.

In the example of FIG. 12, the event may be logged to an integration log 1255. The integration log 1255 indicates, for example, that requests to store "data one" and "data two" in the ECM system 1230 occurred at "time one" and "time two", respectively, and that requests to store "data three" and "data two" in the ECM system 1240 occurred at "time three" and "time two", respectively, and that requests to store "data two", "data four", and "data five" in the ECM system 1250 occurred at "time two", "time four", and "time five", respectively. As indicated in the integration log 1255, a single event may result in requests to store data in multiple ECM systems, as indicated by the multiple, simultaneous requests to store "data two" in each of the ECM systems 1230, 1240, and 1250 at the same time (e.g., "time two").

The system 100 also may, at least temporarily, store the CRM data to be stored in the one or more ECM systems as past of the logging. The temporary storage may be performed, for example, using the local persistent data store 612 described above with respect to FIG. 6. By storing the CRM data included in the integration operation, the system 100 may correct any errors that occurred in performing the integration operation by accessing the temporarily stored CRM data.

Returning to FIG. 11, based on the logging, the system 100 audits the one or more ECM systems to determine whether the CRM data was properly stored (1130). For instance, referring to the example of FIG. 12, the system 100 may process the integration log 1255 and may verify, for each entry in the log 1255, whether the data indicated by the entry was actually stored in the indicated ECM system. Auditing results may be stored, for example, in an audit log 1260. The audit log 1260 indicates, for example, that an audit verified that "data 1" and "data 2" were stored in the ECM system 1230 and that "data two" and "data five" were stored in the ECM system 1250, but that "data three" and "data two" were not stored in the ECM system 1240 and that "data four" was not stored in the ECM system 1250.

The system 100 takes corrective action in response to a determination that the CRM data was not properly stored (1140). For example, the data which was not properly stored and the ECM system which did not properly store the data may be identified, a request to store the data may be reissued to the ECM system, and a verification process may be performed to confirm that the reissued request results in proper storage of the data in the ECM system.

The system 100 provides reporting based on the logging and auditing (1150). For example, the system 100 may generate a report that details integration operations. The system 100 also may determine integration statistics (e.g., statistics related to number of integration operations and/or success and failure rates for integration operations) and include the integration statistics in a generated report. In the example of FIG. 12, the system 100 may generate the report using data stored in the integration log 1255 and/o data stored in the audit log 1260.

Figure 13:
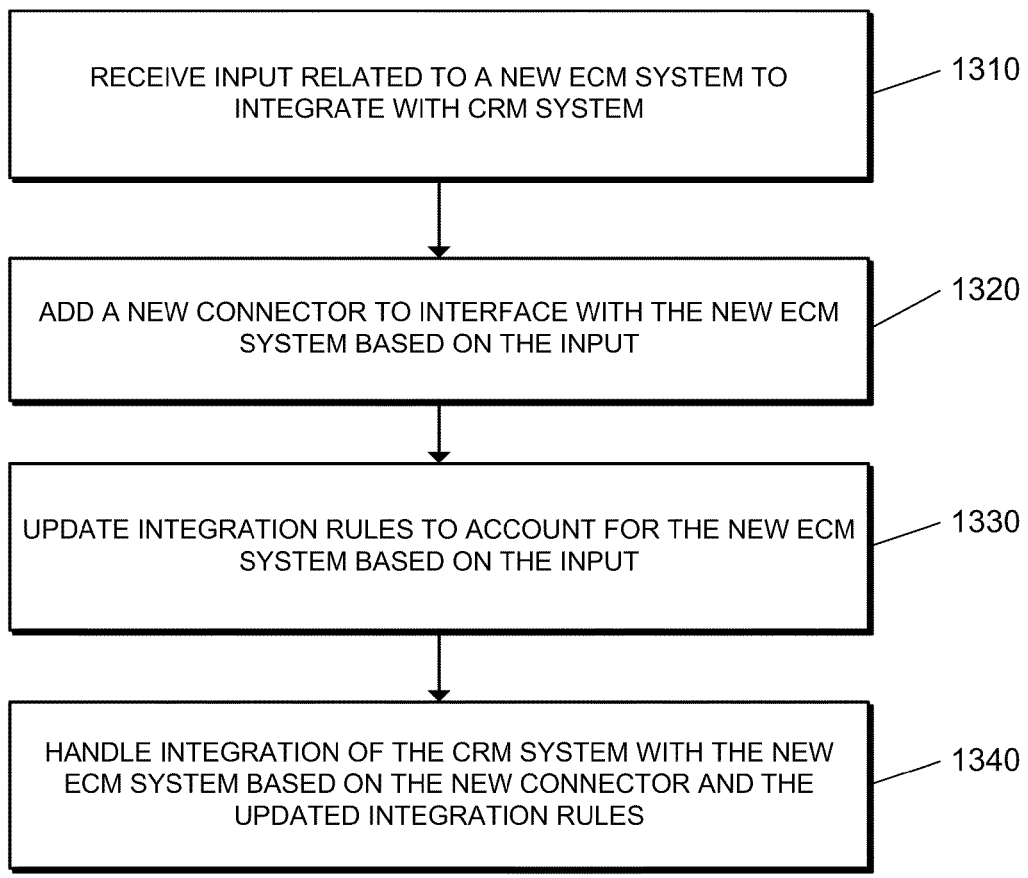

FIG. 13 illustrates an example process 1300 for integrating a new enterprise content management system with a customer relationship management system. The operations of the process 1300 are described generally as being performed by the system 100. The operations of the process 1300 may be performed by one of the components of the system 100 (e.g., the integration framework 140) or may be performed by a combination of the components of the system 100. In some implementations, operations of the process 1300 may be performed by one or more processors included in one or more electronic devices.

Figure 14:
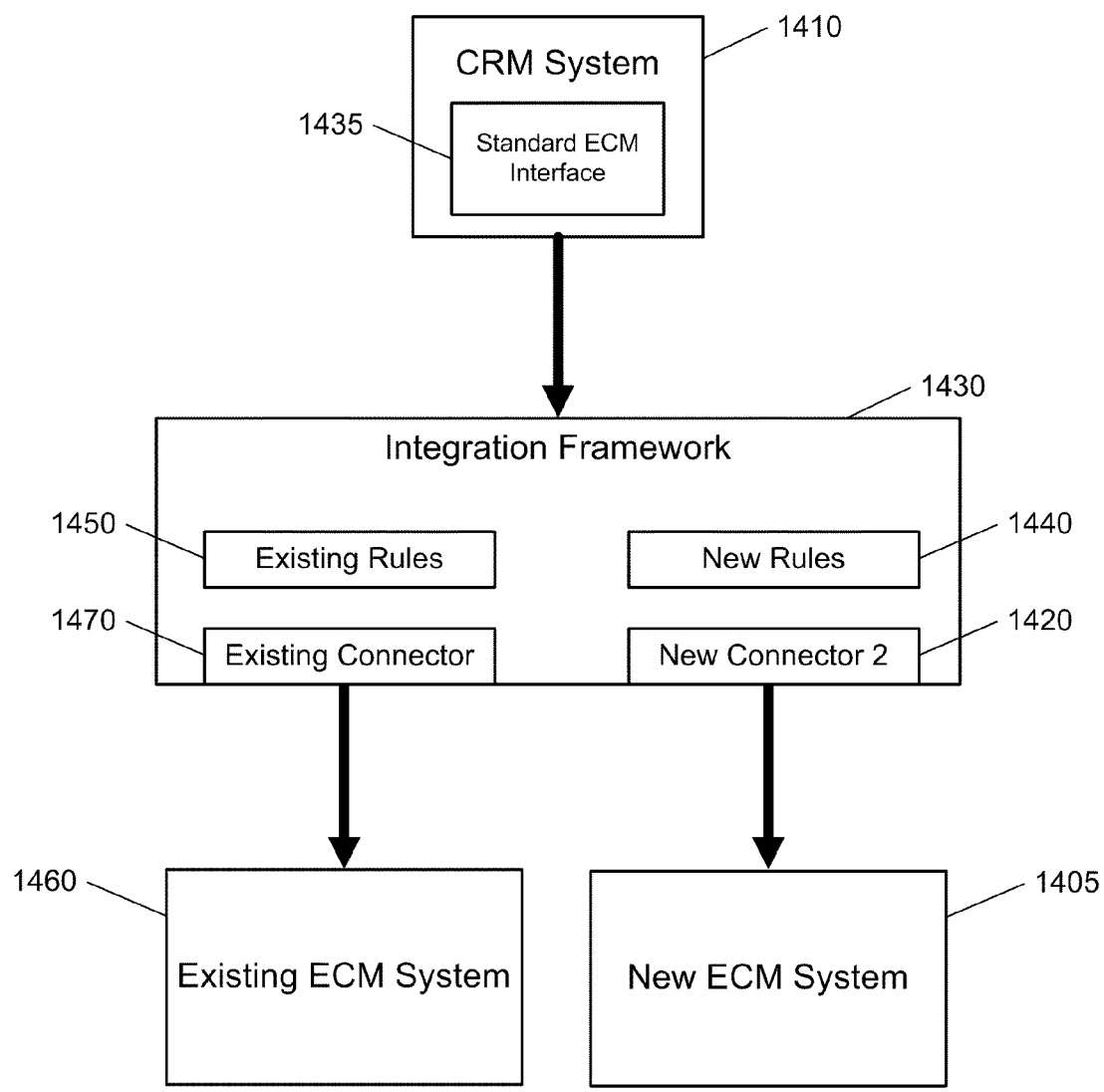

The system 100 receives input related to a new ECM system to integrate with a CRM system (1310). For example, the new ECM system may be a new ECM product offering or may otherwise be an ECM system not previously integrated with the CRM system. As shown in FIG. 14, a company may begin using a new ECM system 1405 and may wish to integrate the new ECM system 1405 with a CRM system 1410 used by the company.

The system 100 adds a new connector to an interface with the new ECM system based on the input (1320). The new connector may be implemented, configured to interface with the new ECM system, and added to an integration framework. Other components may be added to the integration framework to interface with the new ECM system, such as one or more handler components, one or more configuration files, one or more user interface hook components, and one or more webservices hook components.

Also, in some implementations, some existing integration framework components, such as a webservices base connector component and a user interface base connector component, may be updated to interact with newly added components. In the example of FIG. 14, a new connector 1420 is added to an integration framework 1430. The integration framework 1430 may be updated without requiring a change to a standard ECM interface 1435. Because changes to the standard ECM interface 1435 are not needed, a user is able to perform integration operations with the new ECM system 1405 using a known interface that does not require additional training or knowledge by the user to operate.

The system 100 updates integration rules to account for the new ECM system based on the input (1330). For instance, in the example of FIG. 14, new rules 1440 may be added to existing rules 1450, where the existing rules 1450 are associated with an existing ECM system 1460. In addition to updating integration rules for the new ECM system 1405, one or more configuration files may be added or updated. Updating integration rules to account for the new ECM system is described in more detail below with respect to FIGS. 15 and 16.

Returning to FIG. 13, the system 100 handles integration of the CRM system with the new ECM system based on the new connector and the updated integration rules (1340). For instance, in the example of FIG. 14, a request for an ECM operation may be received from the CRM system 1410 through the standard ECM interface 1435. For some requests, the new ECM system 1405 may be selected for performing the operation, the CRM system 1410 may connect to the new ECM system 1405 through the new connector 1420, and the requested operation may be performed according to the new rules 1440. The request for the ECM operation may be received using the same, unchanged standard ECM interface 1435 which had been previously used for integrating the existing ECM system 1460 with the CRM system 1410 prior to the addition of the new ECM system 1405.

After the addition of the new ECM system 1405, for some requested operations, the ECM system 1460 may be requested to perform the operation. For such operations, the CRM system 1410 may connect to the ECM system 1460 through the connector 1470, and the requested operation may be performed according to the existing rules 1450, as occurred prior to the addition of the new ECM system 1405. In other words, addition of the new ECM system 1405 does not impact integration of the CRM system 1410 with the existing ECM system 1460.

Figure 15:
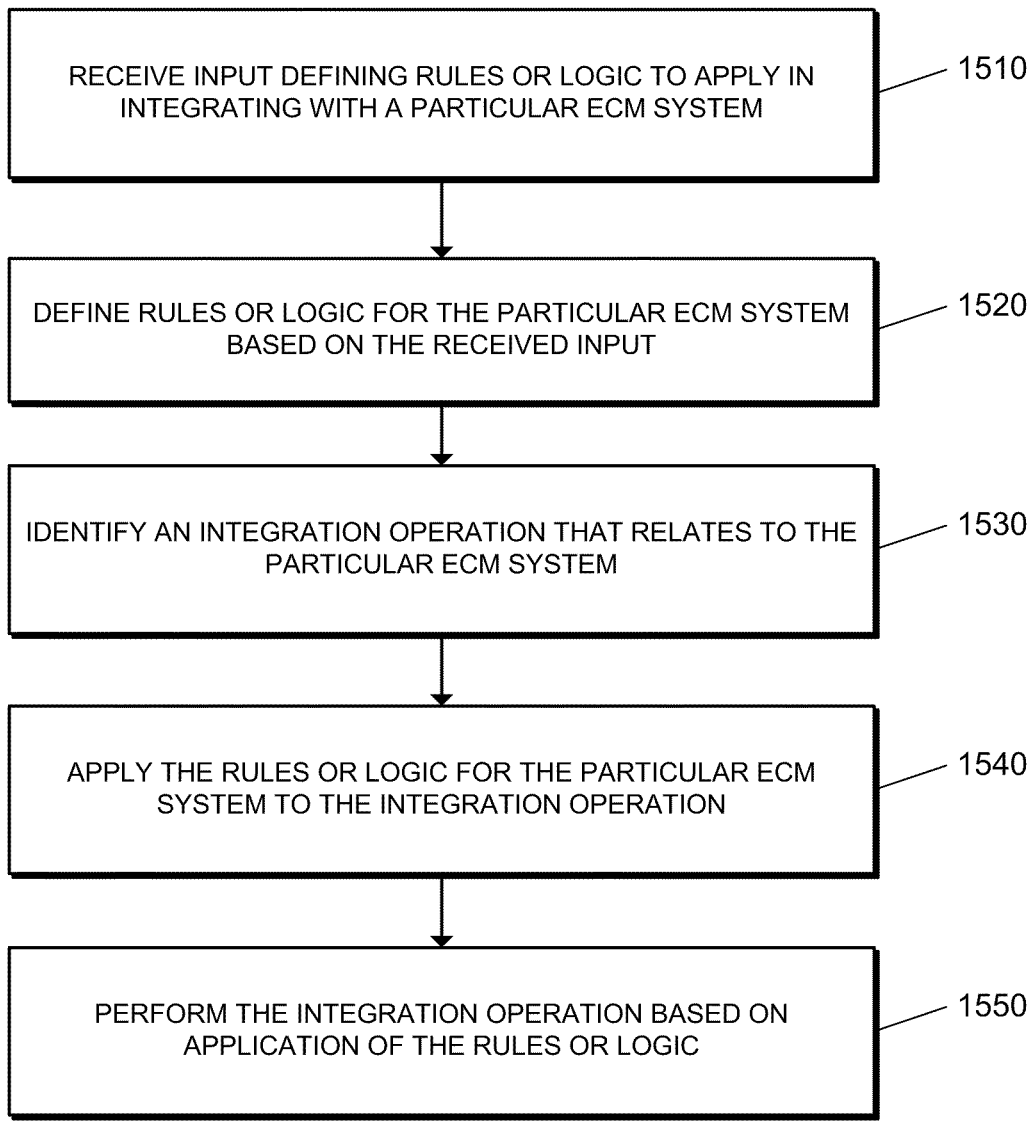

FIG. 15 illustrates an example process 1500 for integrating a customer relationship management application with an enterprise content management system based on a set of integration rules. The operations of the process 1500 are described generally as being performed by the system 100. The operations of the process 1500 may be performed by one of the components of the system 100 (e.g., the integration framework 140) or may be performed by a combination of the components of the system 100. In some implementations, operations of the process 1500 may be performed by one or more processors included in one or more electronic devices.

Figure 16:
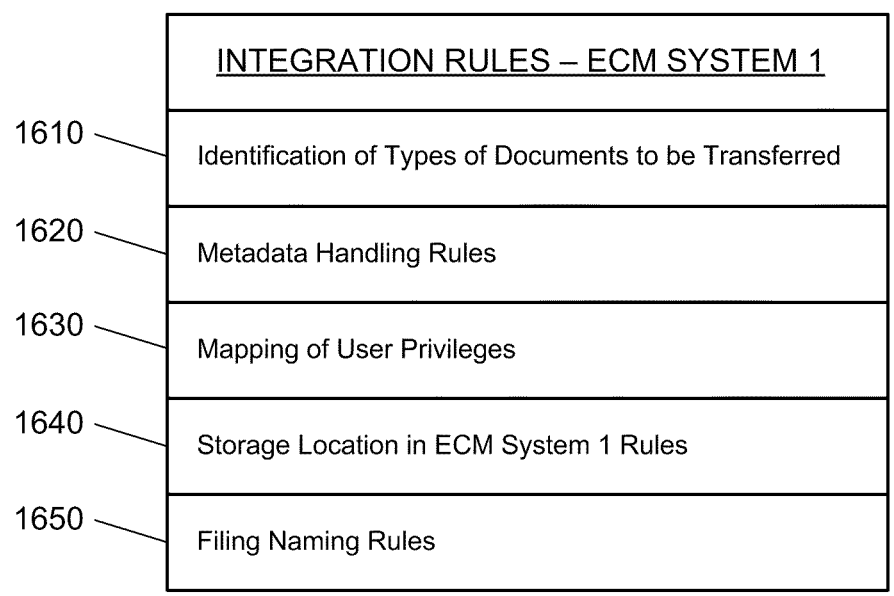
FIG. 16 is a diagram which illustrates exemplary integration rules.

The system 100 receives input defining rules or logic to apply in integrating with a particular ECM system (1510). For example, integration rules for an ECM system (e.g., an existing ECM system or a new ECM system) may be received. For instance, FIG. 16 illustrates example integration rules 1600 which include a rule 1610 for identifying types of documents to be transferred to an ECM system, a rule 1620 for handling metadata for an ECM system, a rule 1630 for mapping of user privileges for an ECM system, a rule 1640 for defining one or more storage locations in an ECM system, and a rule 1650 for naming files in an ECM system.

Returning to FIG. 15, the system 100 defines rules or logic for the particular ECM system based on the received input (1520). For example, the system 100 may define one or more rules in electronic storage. The one or more rules may define criteria and configuration settings for integrating with one or more ECM systems. The one or more rules may include general rules that apply to all ECM systems and/or specific rules that apply to specific ECM systems. The specific rules allow for different operations to be performed when integrating a CRM application with different ECM systems. The specific rules may define data conversion and attribute mapping (e.g., metadata attribute mapping) for each ECM system to ensure data is stored in each ECM system in an appropriate format.

The system 100 identifies an integration operation that relates to the particular ECM system (1530). For example, a request for an ECM operation may be received from a CRM system. The request may be a request to store a document in the particular ECM system, where the document is a particular type of document and the document may have associated metadata. As another example, a request from a particular user to access a document may be received.

The system 100 applies the rules or logic for the particular ECM system to the integration operation (1540) and the system 100 performs the integration operation based on application of the rules or logic (1550). For example, if the integration operation includes a request from a particular CRM application for a particular user to access the ECM system, the system 100 may handle the request based on an integration rule (e.g., rule 1630, FIG. 16) that defines mapping of user privileges for access to documents in the ECM system and the CRM application. In this example, the system 100 may determine whether the user has access rights to documents in the ECM system based on the user privileges mapping. If the user does not have access rights to documents in the ECM system, the system 100 may reject or ignore the request.

As another example, if the integration operation includes a request to store a document in the ECM system, the system 100 may determine a type of the document included in the request and may compare the document type to document types identified by an integration rule as types of documents to transfer to the ECM system. In response to a determination that the determined document type is not included in the types of documents to be transferred to the ECM system, the system 100 may handle the request without transferring the document to the ECM system.

In response to a determination that the determined document type is included in the types of documents to transfer to the ECM system, the system 100 may transfer the document to the ECM system. If the document has associated metadata, the system 100 may, before storing the document, convert a first set of metadata for the document to a second set of metadata appropriate for the ECM system based on an integration rule (e.g., rule 1620, FIG. 16) and may store the document in the ECM system in association with the second set of metadata. Before storing the document, the system 100 may rename the document to a new, different file name based on an integration rule (e.g., rule 1650, FIG. 16) that identifies file name conventions and may use the new file name to identify the document. The system 100 may determine a location to store the document in the ECM system based on an integration rule (e.g., rule 1640, FIG. 16) that identifies a storage location in the system for storing documents from a particular CRM application and may control the ECM system to store the document in the determined location.

Figure 17:
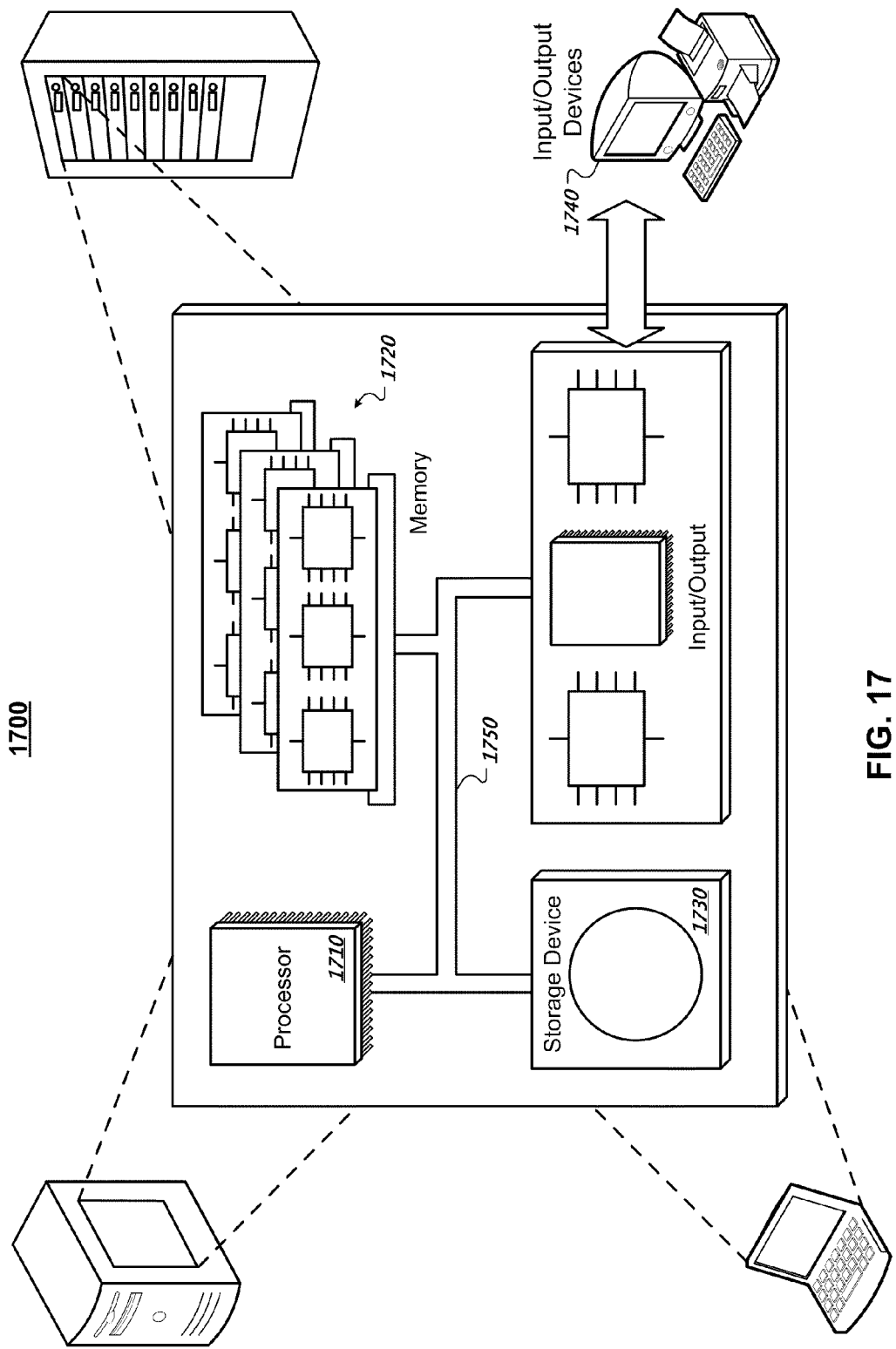

FIG. 17 is a schematic diagram of an example of a computer system 1700. The system 1700 can be used for the operations described in association with the processes 900, 1100, 1300, and 1500 according to one implementation.

The system 1700 includes a processor 1710, a memory 1720, a storage device 1730, and an input/output device 1740. Each of the components 1710, 1720, 1730, and 1740 are interconnected using a system bus 1750. The processor 1710 is capable of processing instructions for execution within the system 1700. In one implementation, the processor 1710 is a single-threaded processor. In another implementation, the processor 1710 is a multi-threaded processor. The processor 1710 is capable of processing instructions stored in the memory 1720 or instructions stored on the storage device 1730 to display graphical information for a user interface on the input/output device 1740.

The memory 1720 stores information within the system 1700. In one implementation, the memory 1720 is a computer-readable medium. In one implementation, the memory 1720 is a volatile memory unit. In another implementation, the memory 1720 is a non-volatile memory unit.

The storage device 1730 is capable of providing mass storage for the system 1700. In one implementation, the storage device 1730 is a computer-readable medium. In various different implementations, the storage device 1730 may be a floppy disk device, a hard disk device, an optical disk device, or a tape device.

The input/output device 1740 provides input/output operations for the system 1700. In one implementation, the input/output device 1740 includes a keyboard and/or pointing device. In another implementation, the input/output device 1740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer system comprising:
   at least one processor; and
   at least one memory coupled to the at least one processor having stored thereon:
      at least one user interface component configured to provide a user interface;
      multiple, different connector components configured to interface with multiple, different enterprise content management systems;
      one or more webservices components configured to perform functionalities of the multiple, different enterprise content management systems; and
   instructions which, when executed by the at least one processor, causes the at least one processor to perform operations comprising:
   receiving, from a customer relationship management application, a request related to performing an operation associated with enterprise content management;
   in response to the request, providing, using the at least one user interface component, a standard user interface that includes a set of user interface elements that apply to operations performed by each of the multiple, different enterprise content management systems serviced by the computer system and that abstract out details of operations of any one of the multiple, different enterprise content management systems;
   receiving user input that is entered into the standard user interface and that requests performance of an enterprise content management operation;
   in response to the user input, identifying, from among the multiple, different enterprise content management systems, a particular enterprise content management system to perform the enterprise content management operation;
   selecting, from among the multiple, different connector components, a particular connector component configured to interface with the particular enterprise content management system identified; and
   using the particular connector component to interface with the particular enterprise content management system and control the particular enterprise content management system to perform the enterprise content management operation,
   wherein providing the standard user interface comprises launching one or more user interface components based on one or more services in the customer relationship management application being invoked, further comprising:
   enabling the one or more services invoked in the customer relationship management application to consume web services offered by the particular enterprise content management system, wherein the one or more services perform enterprise content management functionality by consuming the web services offered by the one or more webservices components.

2. A computer-implemented method of integrating a customer relationship management application with an enterprise content management system, the method comprising:
   receiving, by a computer system and from a customer relationship management application, a request related to performing an operation associated with enterprise content management;
   in response to the request, providing, by the computer system, a standard user interface that includes a set of user interface elements that apply to operations performed by each of multiple, different enterprise content management systems serviced by the computer system and that abstract out details of operations of any one of the multiple, different enterprise content management systems;
   receiving, by the computer system, user input that is entered into the standard user interface and that requests performance of an enterprise content management operation;
   in response to the user input, identifying, from among the multiple, different enterprise content management systems, a particular enterprise content management system to perform the enterprise content management operation;
   selecting, from among multiple, different connector components configured to interface with the multiple, different enterprise content management systems, a particular connector component configured to interface with the particular enterprise content management system identified; and
   using, by the computer system, the particular connector component to interface with the particular enterprise content management system and control the particular enterprise content management system to perform the enterprise content management operation,
   wherein providing, by the computer system, the standard user interface comprises launching one or more user interface components based on one or more services in the customer relationship management application being invoked, further comprising:
   enabling the one or more services invoked in the customer relationship management application to consume web services offered by the particular enterprise content management system, wherein the one or more services perform enterprise content management functionality by consuming web services offered by one or more webservices components configured to perform functionalities of the multiple, different enterprise content management systems.

3. The method of claim 2:
   wherein identifying, from among the multiple, different enterprise content management systems, the particular enterprise content management system to perform the enterprise content management operation comprises identifying, from among the multiple, different enterprise content management systems, at least two enterprise content management systems to perform the enterprise content management operation;
   wherein selecting, from among multiple, different connector components configured to interface with the multiple, different enterprise content management systems, the particular connector component configured to interface with the particular enterprise content management system identified comprises selecting, from among the multiple, different connector components configured to interface with the multiple, different enterprise content management systems, at least two connector components, each connector component being configured to interface with one of the at least two enterprise content management systems identified; and wherein using, by the computer system, the particular connector component to interface with the particular enterprise content management system and control the particular enterprise content management system to perform the enterprise content management operation comprises using, by the computer system, the at least two connector components to interface with the at least two enterprise content management systems and control the at least two enterprise content management systems to perform the enterprise content management operation.

4. The method of claim 2, further comprising:
handling an event that results in a request to store data from the customer relationship management application in one or more of the multiple, different enterprise content management systems; and
in response to the event, logging, in electronic storage separate from the customer relationship management application and the multiple, different enterprise content management systems, the event to identify the data from the customer relationship management application and the one or more of the multiple, different enterprise content management systems requested to store the data from the customer relationship management application.

5. The method of claim 4, further comprising:
based on the logging, auditing the one or more of the multiple, different enterprise content management systems to determine whether the data from the customer relationship management application was properly stored in each of the one or more of the multiple, different enterprise content management systems.

6. The method of claim 5, further comprising:
in response to a determination that the data from the customer relationship management application was not properly stored in each of the one or more of the multiple, different enterprise content management systems:
identifying at least one enterprise content management system in which the data from the customer relationship management application was not properly stored; and
taking corrective action with respect to the at least one enterprise content management system to cause proper storage of the data from the customer relationship management application in the at least one enterprise content management system.

7. The method of claim 5, further comprising:
calculating, based on the logging and auditing, integration statistics related to storage operations requested for each of the multiple, different enterprise content management systems and success or failure of the storage operations;
generating a report that reflects the calculated integration statistics; and
outputting, using an output device, the report.

8. The method of claim 2, further comprising:
receiving user input related to a new enterprise content management system to integrate with the customer relationship management application;
adding a new connector component configured to interface with the new enterprise content management system based on the user input;
updating integration rules to account for the new enterprise content management system based on the user input; and
handling integration of the customer relationship management application with the new enterprise content management system based on the new connector and the updated integration rules.

9. The method of claim 8, further comprising:
maintaining an existing connector component and existing integration rules for an existing enterprise content management system previously integrated with the customer relationship management application such that addition of the new enterprise content management system does not impact integration of the customer relationship management application with the existing enterprise content management system.

10. The method of claim 8, further comprising:
receiving, by the computer system and from the customer relationship management application, a second request related to performing an operation associated with the new enterprise content management system; and
in response to the second request, providing the standard user interface used for the multiple, different enterprise content management systems to enable a user to provide input requesting performance of the operation associated with the new enterprise content management system using the same standard user interface used for the multiple, different enterprise content management systems prior to the addition of the new enterprise content management system.

11. The method of claim 2, further comprising:
receiving user input defining one or more rules to apply in integrating the customer relationship management application with the particular enterprise content management system; and
defining, in electronic storage, the one or more rules for the particular enterprise content management system based on the received user input, the one or more rules for the particular enterprise content management system being applicable to integration operations associated with the particular enterprise content management system and inapplicable to integration operations associated with other of the multiple, different enterprise content management systems.

12. The method of claim 11, further comprising:
identifying an integration operation that relates to the particular enterprise content management system;
applying the one or more rules for the particular enterprise content management system to the integration operation based on the identification of the integration operation as relating to the particular enterprise content management system; and
performing the integration operation that relates to the particular enterprise content management system based on the application of the one or more rules.

13. The method of claim 11, wherein the one or more rules for the particular enterprise content management system comprise a first rule and the particular enterprise content management system is a first enterprise content management system, further comprising:
receiving user input defining a second rule to apply in integrating the customer relationship management application with a second enterprise content management system, the second enterprise content management system being different than the first enterprise content management system and the second rule being different than the first rule;
defining, in electronic storage, the second rule for the second enterprise content management system based on the received user input;
identifying a target enterprise content management system for an integration operation;

determining whether the target enterprise content management system is the first enterprise content management system or the second enterprise content management system;
in response to a determination that the target enterprise content management system is the first enterprise content management system, applying the first rule for the first enterprise content management system to the integration operation; and
in response to a determination that the target enterprise content management system is the second enterprise content management system, applying the second rule for the second enterprise content management system to the integration operation.

14. The method of claim 11, wherein the one or more rules for the particular enterprise content management system comprise a first rule that identifies types of documents to be transferred to the particular enterprise content management system, further comprising:
handling a request to store a document in the particular enterprise content management system by:
determining a type of the document included in the request;
comparing the determined type of the document to the types of documents identified by the first rule;
determining whether the determined type of the document is included in the types of documents identified by the first rule based on the comparison;
in response to a determination that the determined type of the document is included in the types of documents identified by the first rule, transferring the document to the particular enterprise content management system; and
in response to a determination that the determined type of the document is not included in the types of documents identified by the first rule, handling the request without transferring the document to the particular enterprise content management system.

15. The method of claim 11, wherein the one or more rules for the particular enterprise content management system comprise a first rule that defines metadata handling for storing documents in the particular enterprise content management system, further comprising:
receiving a request to store a document in the particular enterprise content management system, the document having a first set of metadata;
converting the first set of metadata for the document to a second set of metadata appropriate for the particular enterprise content management system based on the first rule; and
storing the document in the particular enterprise content management system in association with the second set of metadata appropriate for the particular enterprise content management system.

16. The method of claim 11, wherein the one or more rules for the particular enterprise content management system comprise a first rule that defines mapping of user privileges for access to documents in the particular enterprise content management system and the customer relationship management application, further comprising:
handling user access to the customer relationship management application and the particular enterprise content management system based on the first rule that defines mapping of user privileges for access to documents in the particular enterprise content management system and the customer relationship management application.

17. The method of claim 11, wherein the one or more rules for the particular enterprise content management system comprise a first rule that identifies a storage location in the particular enterprise content management system for storing documents from the customer relationship management application, further comprising:
receiving a request to store a document in the particular enterprise content management system;
determining a location to store the document in the particular enterprise content management system based on the first rule that identifies the storage location in the particular enterprise content management system for storing documents from the customer relationship management application; and
controlling the particular enterprise content management system to store the document in the determined location.

18. The method of claim 11, wherein the one or more rules for the particular enterprise content management system comprise a first rule that identifies file name conventions for naming documents from the customer relationship management application that are stored in the particular enterprise content management system, further comprising:
receiving a request to store a document in the particular enterprise content management system, the document having a first file name;
renaming the document to a second file name based on the first rule that identifies file name conventions, the second file name being different than the first file name; and
controlling the particular enterprise content management system to store the document in the particular enterprise content management system using the second file name to identify the document.

19. The method of claim 2, wherein the one or more services in the customer relationship management application, in response to being invoked, launch the one or more user interface components and begin consuming the web services offered by the one or more webservices components.

20. At least one non-transitory computer-readable storage medium encoded with executable instructions that, when executed by at least one processor, cause the at least one processor to perform operations comprising:
receiving, from a customer relationship management application, a request related to performing an operation associated with enterprise content management;
in response to the request, providing a standard user interface that includes a set of user interface elements that apply to operations performed by each of multiple, different enterprise content management systems serviced by the computer system and that abstract out details of operations of any one of the multiple, different enterprise content management systems;
receiving user input that is entered into the standard user interface and that requests performance of an enterprise content management operation;
in response to the user input, identifying, from among the multiple, different enterprise content management systems, a particular enterprise content management system to perform the enterprise content management operation;
selecting, from among multiple, different connector components configured to interface with the multiple, different enterprise content management systems, a particular connector component configured to interface with the particular enterprise content management system identified; and
using the particular connector component to interface with the particular enterprise content management system and control the particular enterprise content management system to perform the enterprise content management operation, wherein providing, by the computer system, the standard user interface comprises launching one or more user interface components based on one or more services in the customer relationship management application being invoked, further comprising:

enabling the one or more services invoked in the customer relationship management application to consume web services offered by the particular enterprise content management system, wherein the one or more services perform enterprise content management functionality by consuming web services offered by one or more webservices components configured to perform functionalities of the multiple, different enterprise content management systems.

* * * * *